(12) United States Patent
Yammahi et al.

(10) Patent No.: US 10,521,441 B2
(45) Date of Patent: Dec. 31, 2019

(54) SYSTEM AND METHOD FOR APPROXIMATE SEARCHING VERY LARGE DATA

(71) Applicants: Maryam Yammahi, Alexandria, VA (US); Simon Berkovich, Rockville, MD (US); Chen Shen, Knoxville, TN (US)

(72) Inventors: Maryam Yammahi, Alexandria, VA (US); Simon Berkovich, Rockville, MD (US); Chen Shen, Knoxville, TN (US)

(73) Assignee: The George Washington University, Washington, DC (US)

(*) Notice: Subject to any disclaimer, the term of this patent is extended or adjusted under 35 U.S.C. 154(b) by 845 days.

(21) Appl. No.: 14/588,672

(22) Filed: Jan. 2, 2015

(65) Prior Publication Data
US 2015/0186471 A1    Jul. 2, 2015

Related U.S. Application Data

(60) Provisional application No. 62/028,524, filed on Jul. 24, 2014, provisional application No. 61/923,087, filed on Jan. 2, 2014.

(51) Int. Cl.
*G06F 16/2458* (2019.01)
*G06F 16/35* (2019.01)
(Continued)

(52) U.S. Cl.
CPC ........ *G06F 16/2468* (2019.01); *G06F 16/285* (2019.01); *G06F 16/3338* (2019.01); *G06F 16/35* (2019.01); *Y02D 10/45* (2018.01)

(58) Field of Classification Search
USPC ....................................................... 707/780
See application file for complete search history.

(56) References Cited

U.S. PATENT DOCUMENTS

| 3,723,979 A | * | 3/1973 | Mundy | ............... G06F 11/1064 365/240 |
| 7,168,025 B1 | * | 1/2007 | Berkovich | .......... G06F 17/3033 707/E17.005 |

(Continued)

OTHER PUBLICATIONS

M. S. Yammahi et al., "Approximate Search in Very Large Files Using the Pigeonhole Principle", International Review on Computers and Software (IRECOS), vol. 8, No. 12., Dec. 2013.

(Continued)

*Primary Examiner* — Tamara T Kyle
*Assistant Examiner* — Raheem Hoffler
(74) *Attorney, Agent, or Firm* — Blank Rome LLP

(57) ABSTRACT

The invention provides efficient searching with fuzzy criteria in very large information systems. The technique of the present invention uses the Pigeonhole Principle approach. This approach can be utilized with different embodiments, but the most effective realization would be to amplify some already given intrinsic approximate matching capabilities, like those in the FuzzyFind method [1][2]. Considering the following problem, data to be searched is presented as a bit-attribute vector. The searching operation includes finding a subset of this bit-attribute vector that is within particular Hamming distance. Normally, this search with approximate matching criteria requires sequential lookup for the whole collection of the attribute vector. This process can be easily parallelized, but in very large information systems this still would be slow and energy consuming. The present invention provides approximate search in very large files using the Pigeonhole Principle, circumvents the sequential search operations and reduces the calculations tremendously.

18 Claims, 15 Drawing Sheets

(51) Int. Cl.
  *G06F 16/28* (2019.01)
  *G06F 16/33* (2019.01)

(56) References Cited

U.S. PATENT DOCUMENTS

| | | | | |
|---|---|---|---|---|
| 7,333,980 | B2* | 2/2008 | Bjornson | G06F 16/2474 |
| 2006/0072582 | A1* | 4/2006 | Bronnimann | H04L 12/2854 |
| | | | | 370/395.32 |
| 2009/0182728 | A1* | 7/2009 | Anderson | G06F 17/30522 |
| 2011/0246409 | A1* | 10/2011 | Mitra | G06F 17/18 |
| | | | | 706/52 |
| 2015/0317281 | A1* | 11/2015 | Sharifi | G06F 17/15 |
| | | | | 708/422 |
| 2016/0098411 | A1* | 4/2016 | Tandon | G06F 17/30675 |
| | | | | 707/759 |

OTHER PUBLICATIONS

M. Crochemore, et al., "Gapped Suffix Arrays: a New Index Structure for Fast Approximate Matching", HAL archives-ouvertes, HAL ID: hal-00742048; https://hal-upec-upem.archives-ouvertes.fr/hal-00742048, Feb. 2013, 7 pages.

S. Y. Berkovich, et al., "Reversing the Error-Correction Scheme for a Fault-Tolerant Indexing", The Computer Journal, vol. 43, No. 1, 2000, pp. 54-64.

P. Clifford, et al., "Simple Deterministic Wildcard Matching", Elsevier, Aug. 9, 2006, 3 pages.

R. Cole, et al., "Tree Pattern Matching and Subset Matching in Randomized $O(nlog^3 m)$ Time", STOC, 1997, pp. 66-75.

M. Hadjieleftheriou, et al., "Efficient Approximate Search on String Collections", VLDB '09, Aug. 24-28, 2009, 2 pages.

S. Berkovich et al., "On Clusterization of "Big Data" Streams", Computing for Geospatial Research Institute Department of Computer Science, George Washington University, 6 pages, 2002.

M. Yammahi et al., "An Efficient Technique for Searching Very Large Files with Fuzzy Criteria using the Pigeonhole Principle", 2014 Fifth International Conference on Computing for Geospatial Research and Application, 2014 IEEE, pp. 82-86.

S. Berkovich, et al., "Organization of Automatic Spelling Correction: Towards the Design of Intelligent Information Retrieval Systems", the $21^{st}$ National Conference of the ASEM, pp. 525-527, 2000.

K. Kukich, "Techniques for Automatically Correcting Words in Text", ACM Computing Surveys, vol. 24, No. 4, Dec. 1992, pp. 377-439.

T. Poomvichid, et al., "The QR Code for Audio Watermarking Using Genetic Algorithm", International Conference on Machine Learning and Computer Science (IMLCS'2012), Aug. 11-12, 2012, Phuket (Thailand), pp. 171-174.

* cited by examiner

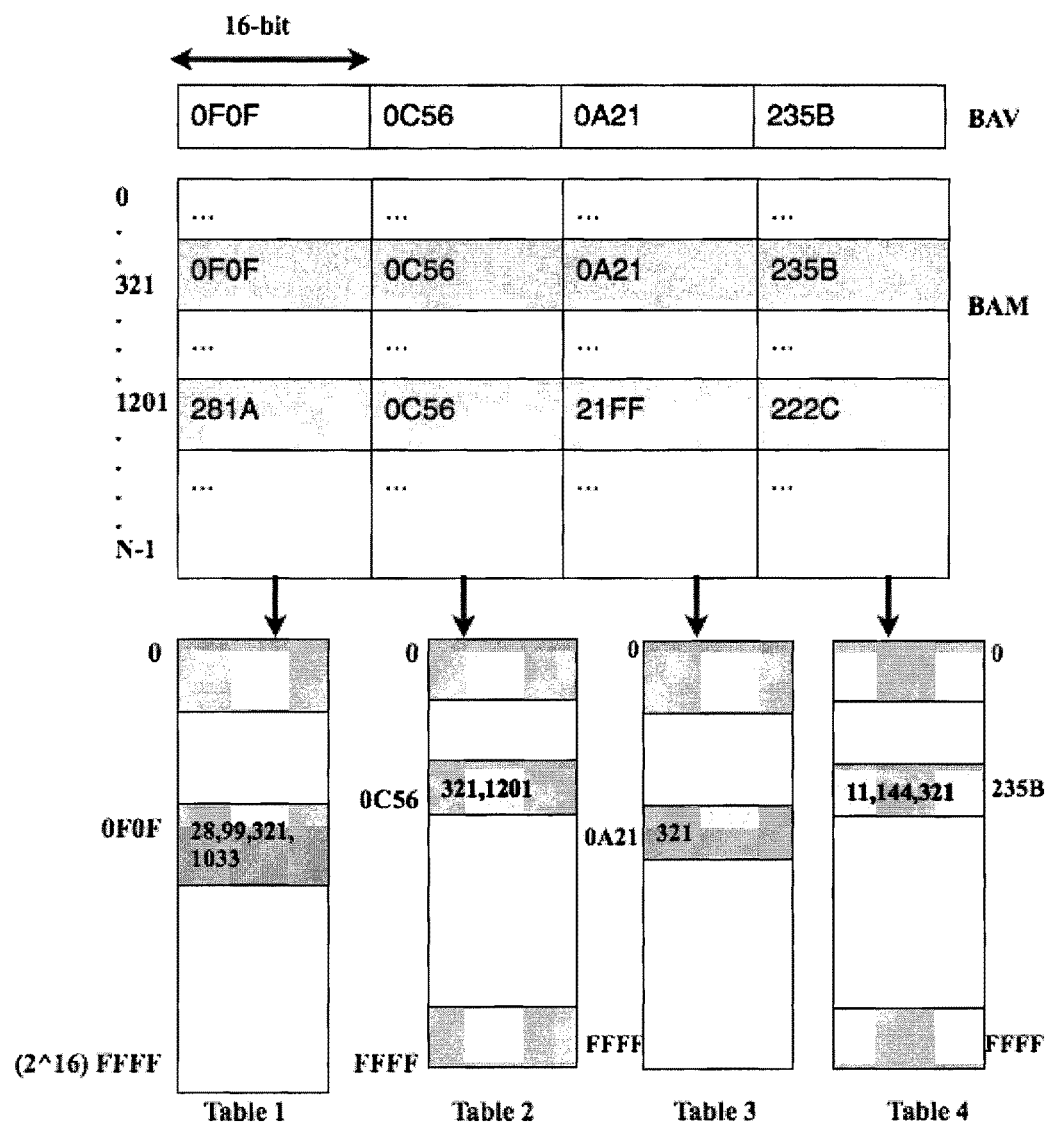
Fig. 2A - 16-bit indexing

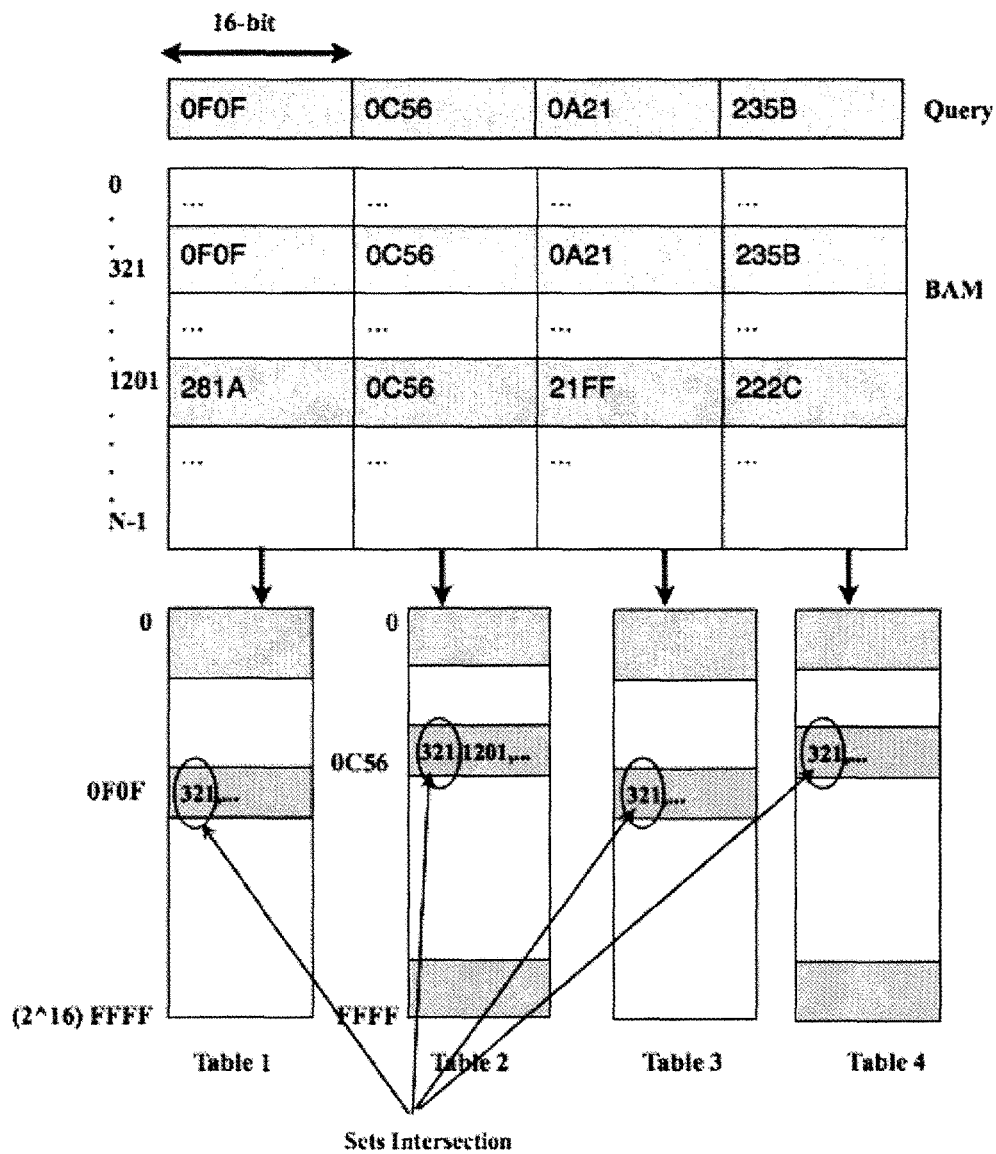
Fig. 2B - Exact Pigeonhole method (get Intersection)

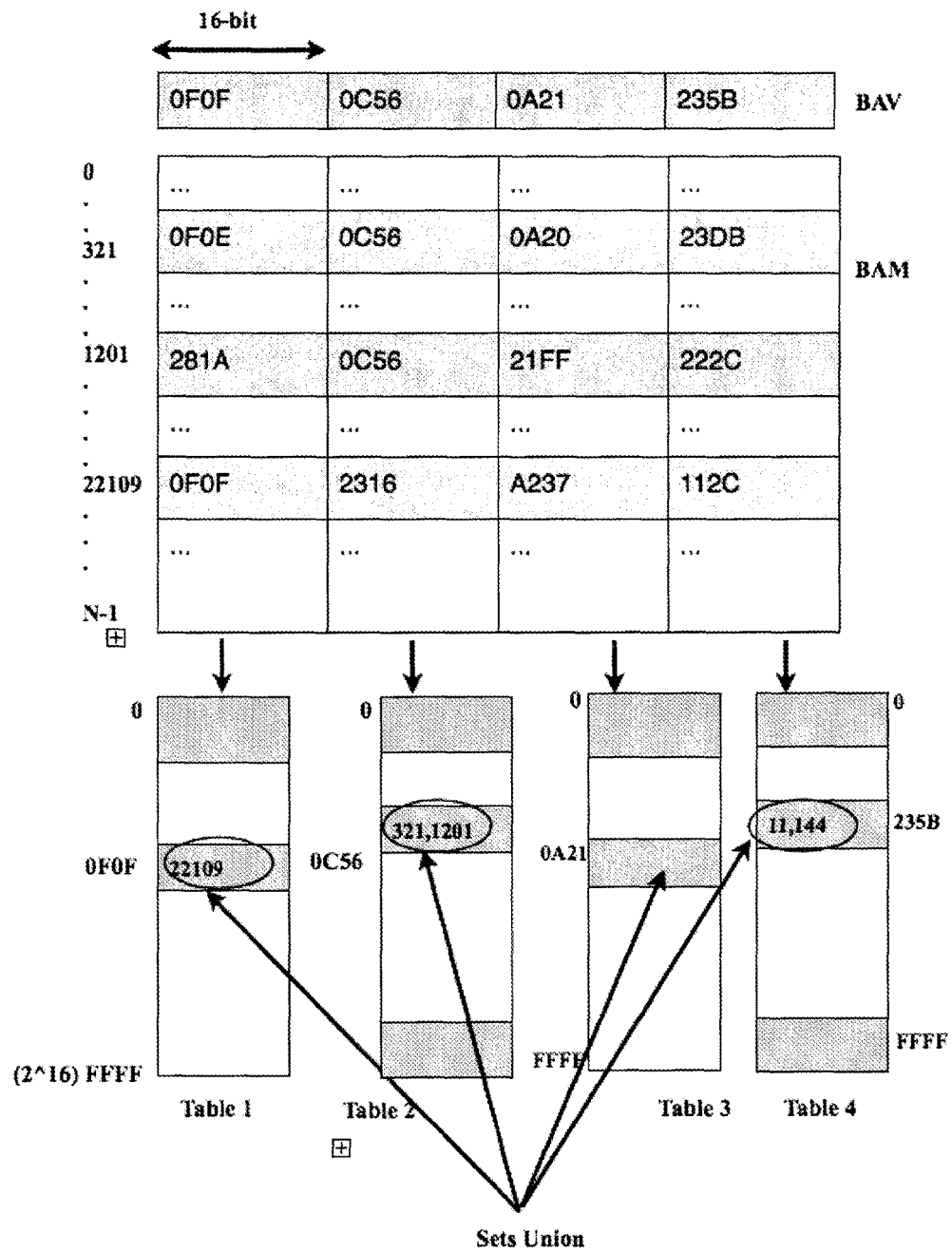
Fig. 2C - Approximate Pigeonhole method (get union)

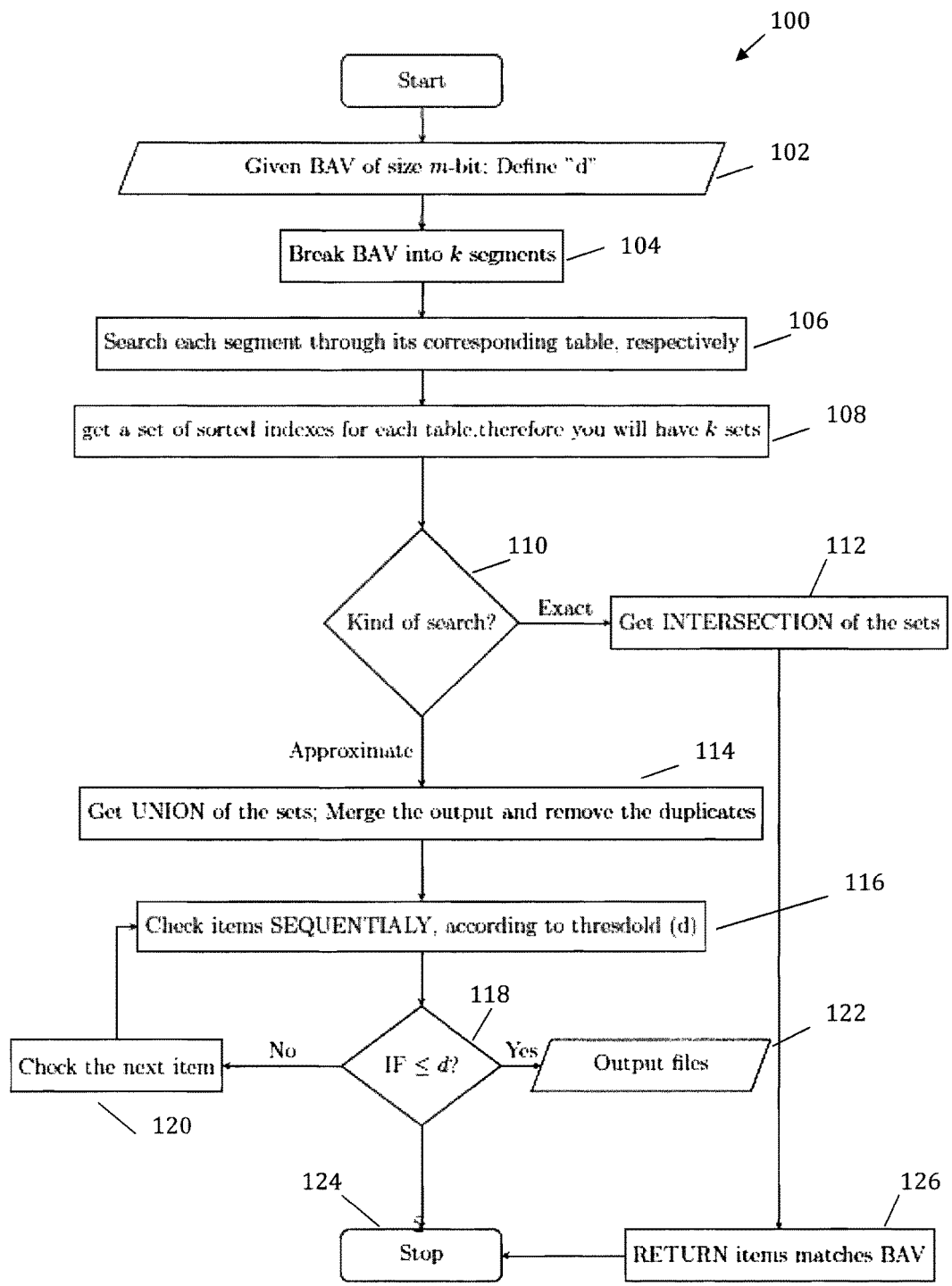
Fig. 3 - The software structure for Pigeonhole Search

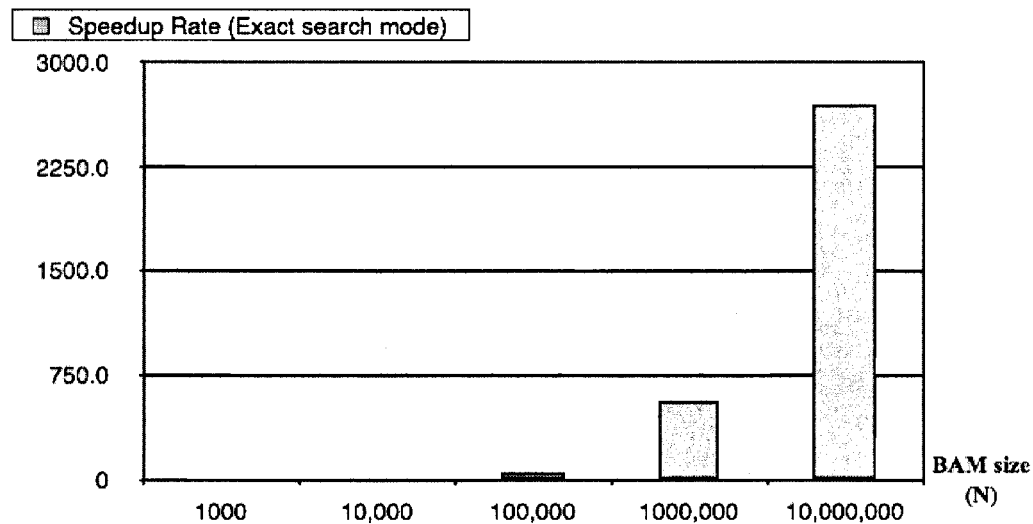
Fig. 4A - Speedup rate in exact search mode
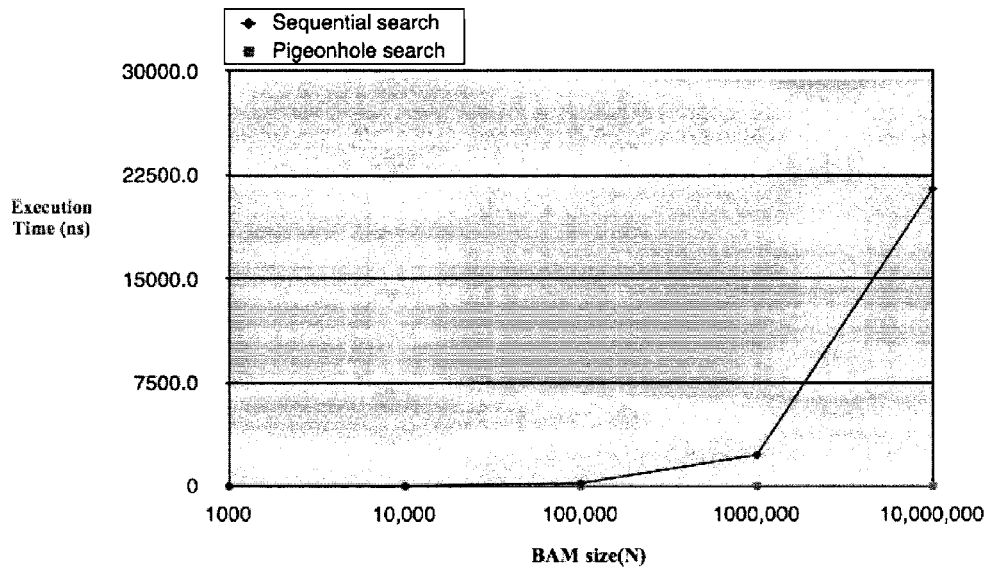
Fig. 4B - Execution time for both algorithms in exact mode

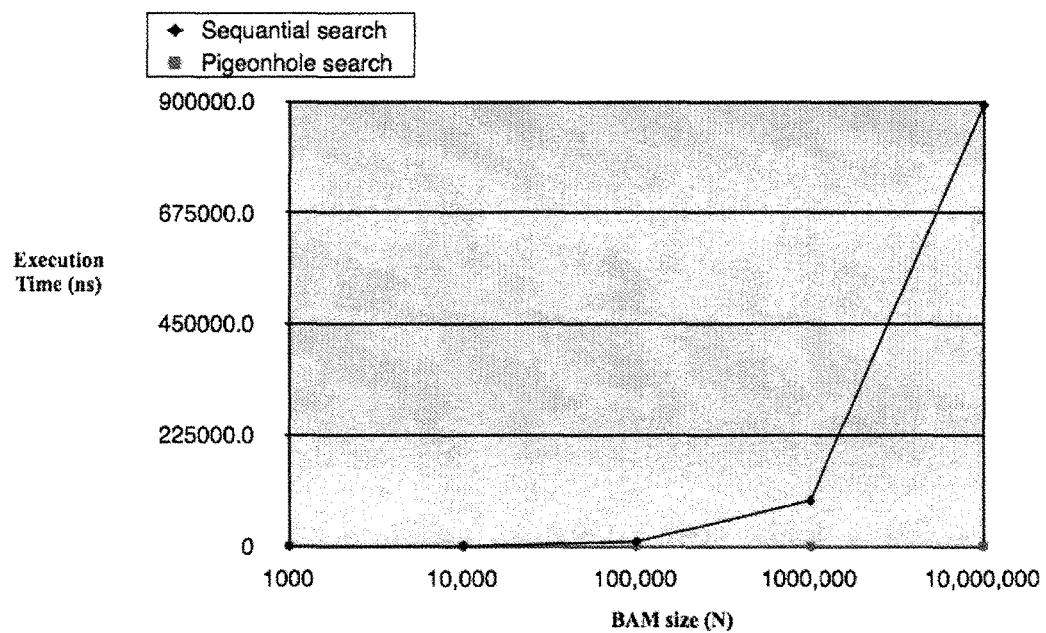
Fig. 5A - Execution time for both algorithms in approximate mode
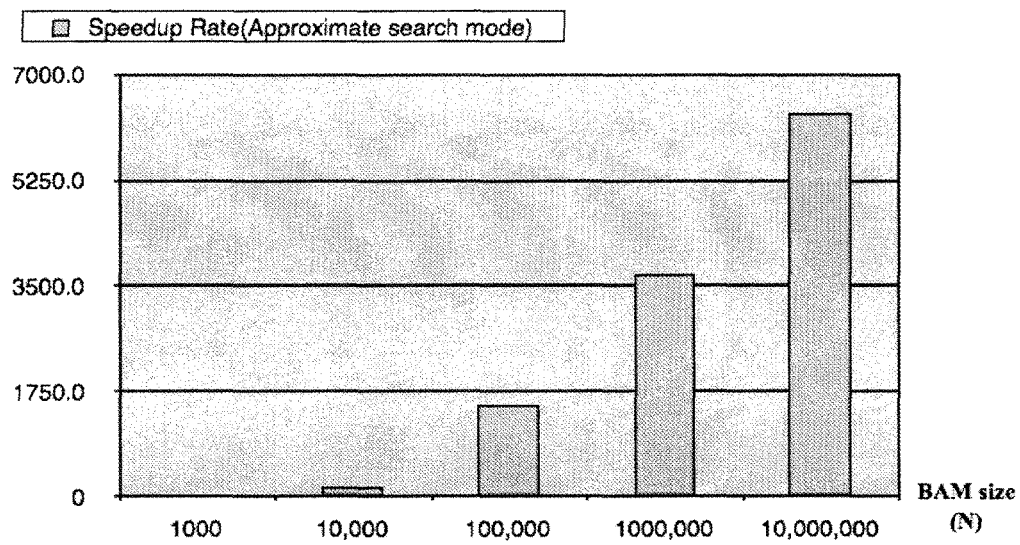
Fig. 5B - Speedup rate in approximate search mode

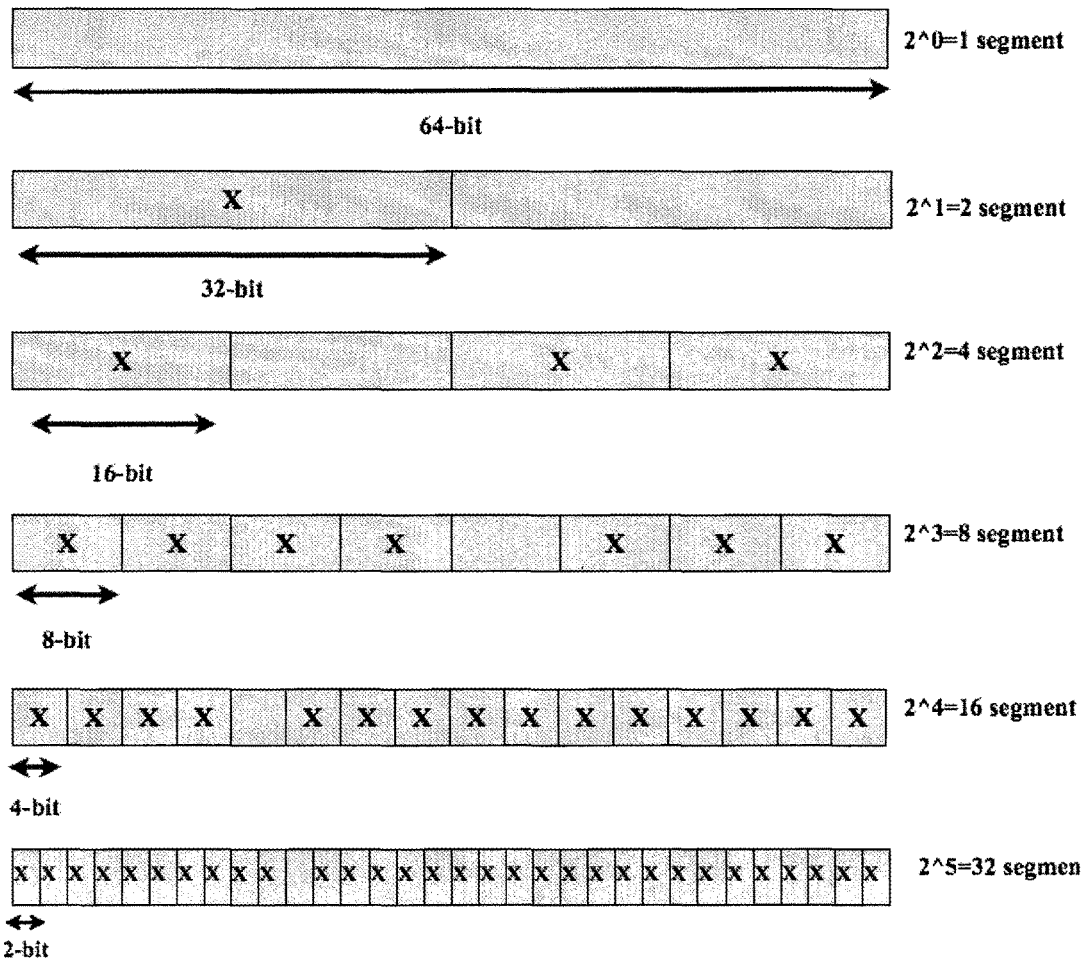
Fig. 6 - Different k-segmentation for 64-bit BAV

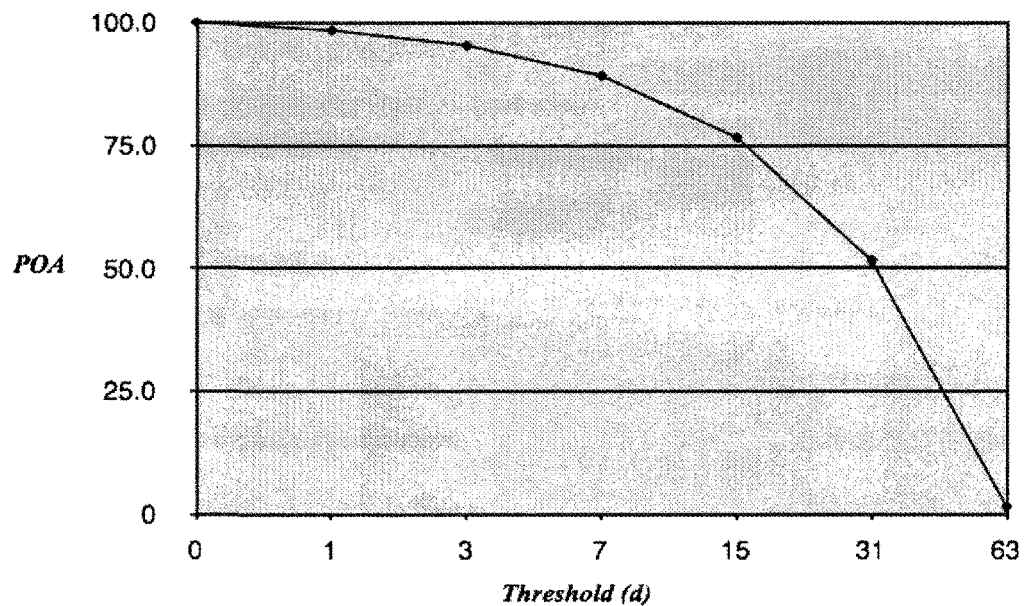
Fig. 7A - Percentage of Accuracy on different Thresholds of 64-bit BAV
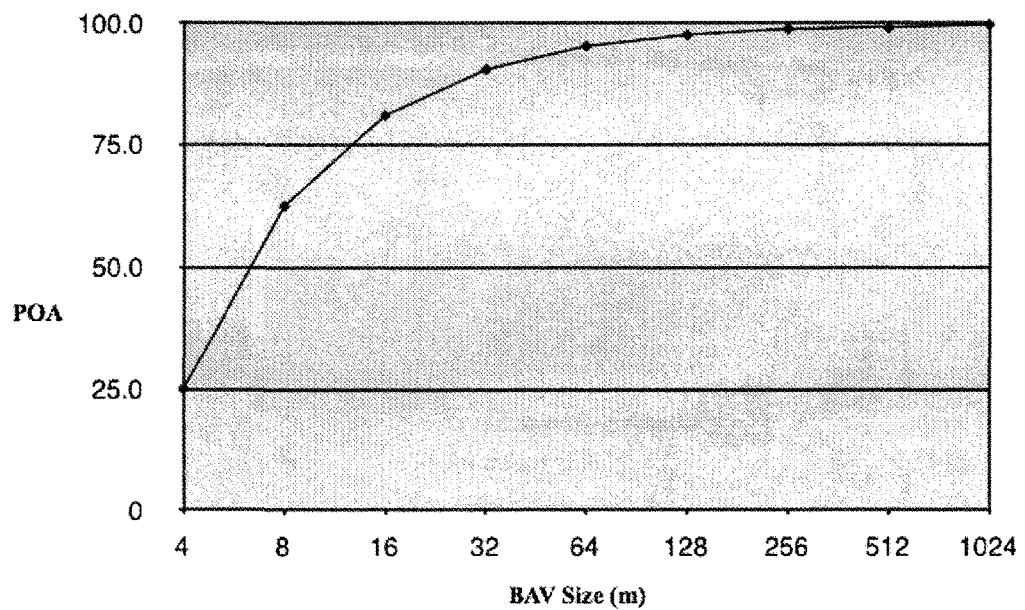
Fig. 7B - Percentage of Accuracy on different BAV sizes with k=4

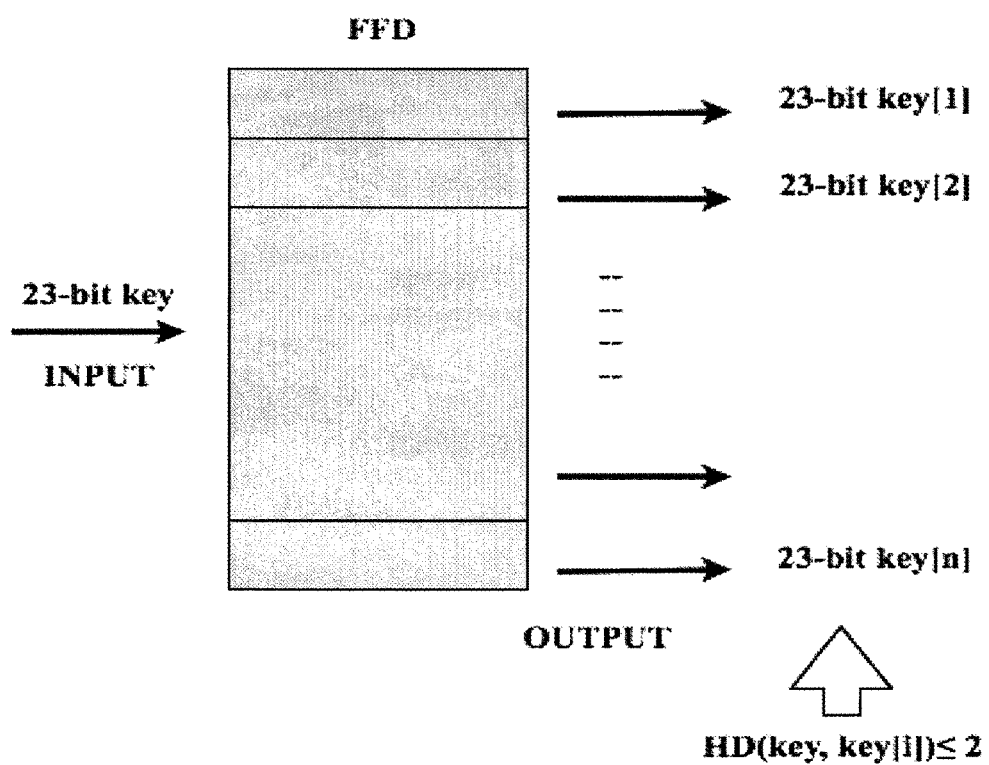
Fig. 8 - FuzzyFind Dictionary structure

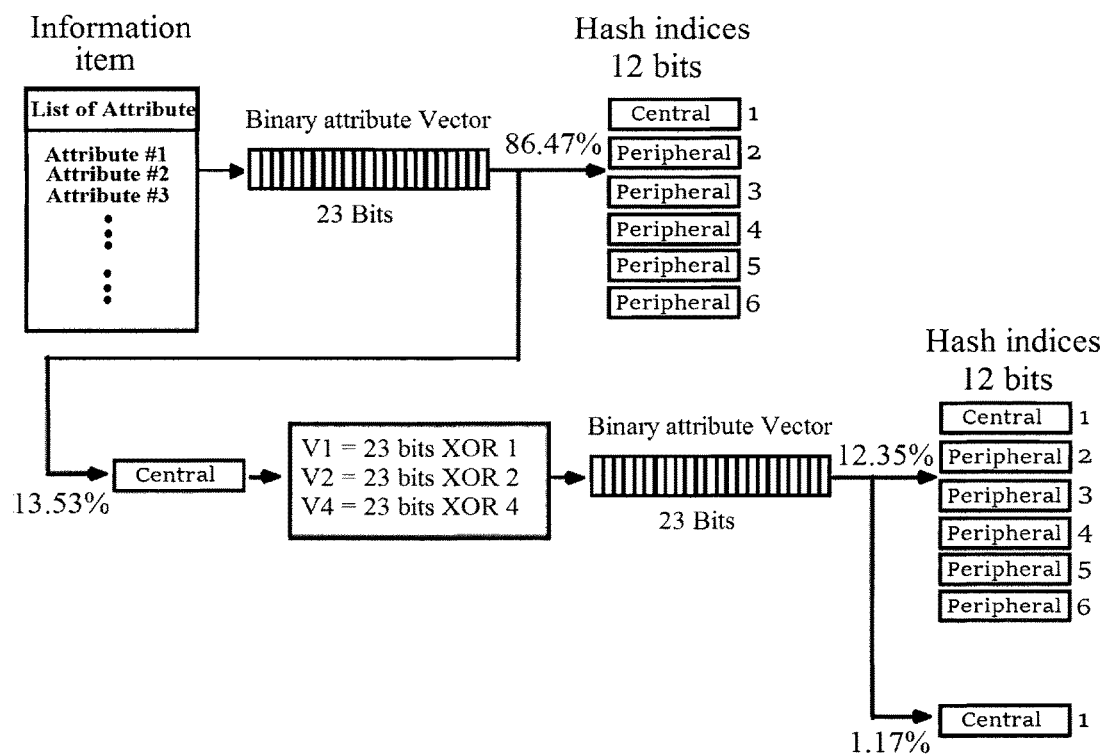
Fig. 9 – The basic scheme for fault-tolerant hashing with Golay code transformation and FuzzyFind transformation Fig. 11 The developed scheme of the Pigeonhole search with FFD Fig. 12 - Comparison of Pigeonhole search speedup in both schemes.

SYSTEM AND METHOD FOR APPROXIMATE SEARCHING VERY LARGE DATA

RELATED APPLICATIONS

This application claims the benefit of U.S. Provisional Application No. 61/923,087, filed Jan. 2, 2014, and U.S. Provisional Application No. 62/028,524, filed Jul. 24, 2014. The entire contents of those applications are incorporated herein by reference.

BACKGROUND OF THE INVENTION

Field of the Invention

The present invention relates to a system and method for searching large amounts of data, and more particularly for searching very large data using a Pigeonhole Principle with fuzzy criteria.

Background of the Related Art

Big Data is the new term of the exponential growth of data in the Internet. The importance of Bio Data is not about how large it is, but about what information you can get from analyzing these data. Such analysis would help many businesses on making smarter decisions, and provide time and cost reduction. Therefore, to make such analysis, you will definitely need to search the large files on Big Data. Big Data is such a construction where sequential search is prohibitively inefficient, in terms of time and energy. Therefore, any new technique that allows very efficient search in very large files is highly demanded.

Information Retrieval systems naturally exist in many applications that require obtaining information resources related to specified information. Web search engines are the most well known Information Retrieval applications Like Google, Yahoo, and others. These information retrieval systems require fast and efficient searching and processing. In which it presents a challenge in using large collections of information items in Data management systems. This issue becomes extremely important with the availability of huge amounts of data through the Internet, "Big Data".

An interesting issue with most of the existing IR applications' interactive techniques is that they only support substring matching without considering approximate searching. Therefore, approximate searching of information items in very large data files is even more challenging Computer Science problem. Usually, the solution of this problem relies on brute force approach, which results in sequential look-up of the file. In many cases, this substantially undermines system performance. It also, consumes a lot of time and energy. The good new is that the sequential processes can be easily parallelized; however in a very large information system, this would be very expensive and costly solution. Therefore, a fast algorithm that solves this problem is highly demanded.

The problem of "approximate" pattern matching is a well-studied problem and has received a lot of attention, in a view of the fact that several applications require approximate matching rather than exact matching of the pattern [3]. Typically, these applications, such as information retrieval, pattern recognition, computational biology and others [4]."Therefore, a fast algorithm for approximate pattern matching is highly demanded" [5]. One paper [6] indicates the importance of approximate matching. In this kind of matching, we are looking for the closest solution, which depends on the considered type of errors. "Mismatch is the one of the most common errors and the number of mismatches between two equal length strings is called the Hamming distance. Approximate pattern matching with Hamming distance refers to the problem of finding all the substrings with Hamming distance less than specified distance from the pattern"[7]. There are many different algorithms dealing with the problem of approximate pattern matching within specified Hamming distance in the pattern matching literature. A well-known algorithm is the Shift-Add algorithm for both exact and approximate string matching [8]. Another algorithm based on convolutions is given in [9]. Others used trees in their search model like [10], [11], and [12]. Furthermore, there are other works considered searching very large data files like [13], [14], [15], and [16]. An interesting method of matching string patterns in large textual files is presented in [17]. It is based upon the hash transformation mapping of string segments on to key numbers; thus locating the matching pattern faster. They used the segments to detect the errors. Therefore, the pattern is divided into fixed length segments that, in total, are representing the actual searched pattern; and then match these segments with its pattern in a hash table. In [18] and [19], the authors, used the Pigeonhole Principle for pattern matching in string search. They divided the pattern into a specific number of segments, in order to have at least one exact match segment with the pattern and at most one less of the number of segments errors from the pattern.

The algorithms in the previous mentioned literature are mostly support substring matching in string search, while in the algorithm of the present invention, considers a novel technique of fuzzy search in very large data files. Also, we used the Pigeonhole Principle for searching and not for pattern matching in string search as in [18] and [19]. Furthermore, in our new searching technique, we expand the Pigeonhole searching capabilities by making the basic search utilized with intrinsic approximate search method, like FuzzyFind method [1][2].

SUMMARY OF THE INVENTION

The present technique presents an efficient searching with fuzzy criteria in very large information systems. It uses a different approach based on the Pigeonhole Principle. This approach can be utilized with different embodiments, but the most effective realization would be to amplify some already given intrinsic approximate matching capabilities, like those in the FuzzyFind method [1] [2]. Thus the new search technique expands the considered facilities significantly and incorporates a FuzzyFind technique. Also, results are presented reflecting the effective performance of the present technique compared to the sequential look-up. Also, we used the Pigeonhole Principle for searching and not for pattern matching in string search as in [18] and [19].

Thus, the present invention presents an innovative approach for efficient searching with fuzzy criteria in very large information systems (Big Data). Organization of efficient access to a large amount of information by an "approximate" or "fuzzy" indication is a rather complicated Computer Science problem. Usually, the solution of this problem relies on a brute force approach, which results in sequential look-up of the file. In many cases, this substantially undermines system performance. The technique in this invention uses different approach based on the Pigeonhole Principle. It is specifically aimed at selecting binary feature vectors from the rows of bit-attribute matrix that are within a specified Hamming distance. Therefore, it searches binary strings that match the given request approximately.

The sequential lookup can be speed up by using bit-attribute matrix in a vertical format. Yet this may still not be sufficient enough for the case of very large databases, like those beyond terabytes. The new invention substantially reduces sequential search operations and works extremely efficiently from several orders of magnitude including speed, cost and energy.

An important operation in the information retrieval processing is to retrieve items with approximately—rather than exactly—matching attributes. This issue has received a lot of consideration, in a view of the fact that several applications require approximate matching operations. Typically, these applications, such as information retrieval, pattern recognition, computational biology and others [1]. In this kind of matching, we are looking for the closest solution, which depends on the considered type of errors. Considering the information items are represented as binary vector with bit position values featuring the presence or absence of corresponding attributes [2]. Then, it is important to select vectors that are close to the given vector in term of the Hamming distance, which indicates the number of mismatches between two strings of equal length. There are many suggested algorithms in the literature review that deals with the approximate matching problem. However, most of these studies only considered substring matching of a pattern without considering approximate or fuzzy searching, such as [3][4] and [5]. Other studies are based on some sophisticated combinations of approximate matching like [6] and [7].

Achieving an efficient approximate search has become very challenging with the huge availability of the information in the Internet. The challenging in the solution of this problem is that a non-exact access has to be formulated by means of the exact operational instructions [8]. Usually the solution, in the case of having high dimensional objects with a large number of attributes, is based on brute force approach which implies sequential comparison of all the elements of the system with the given information item [2]. In many cases, this substantially undermines system performance.

We are presenting a novel searching technique that searches very large files (beyond terabytes) with fuzzy criteria. The basic utilization of this new technique has been introduced in [9]. Here we used inverted tables for the indexing in the suggested approach. Then in our work [10] we developed the invention using a new and advanced indexing data structure based on FuzzyFind method [10][11]. The developed scheme provides more accuracy than the basic utilization of the technique of the present invention. It also allows more mismatches tolerance. Both schemes work much faster than the sequential search. Further details of the system and method are provided in the sections below.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 2A shows 16-bit indexing;

FIG. 2B is the exact Pigeonhole technique (get Intersection);

FIG. 2C is an approximate Pigeonhole method (get union);

FIG. 3 is a flow diagram showing operation of the system of the invention;

FIG. 4A is a chart showing the speedup rate in exact search mode;

FIG. 4B is a chart showing the execution time for both algorithms in exact mode;

FIG. 5A is a chart showing the execution time for both algorithms in approximate mode;

FIG. 5B is a chart showing the speedup rate in approximate search mode;

FIG. 6 is a different k-segmentation for 64-bit BAV;

FIG. 7A is a chart showing the percentage of accuracy on different Thresholds of 64-bit BAV;

FIG. 7B is a chart showing the percentage of accuracy on different BAV sizes with k=4;

FIG. 8 shows the FuzzyFind Dictionary (FFD) structure in accordance with an embodiment of the invention;

FIG. 9 is the basic scheme for fault-tolerant hashing with Golay code transformation and FuzzyFind transformation;

DETAILED DESCRIPTION OF THE PREFERRED EMBODIMENTS

Figure 1:
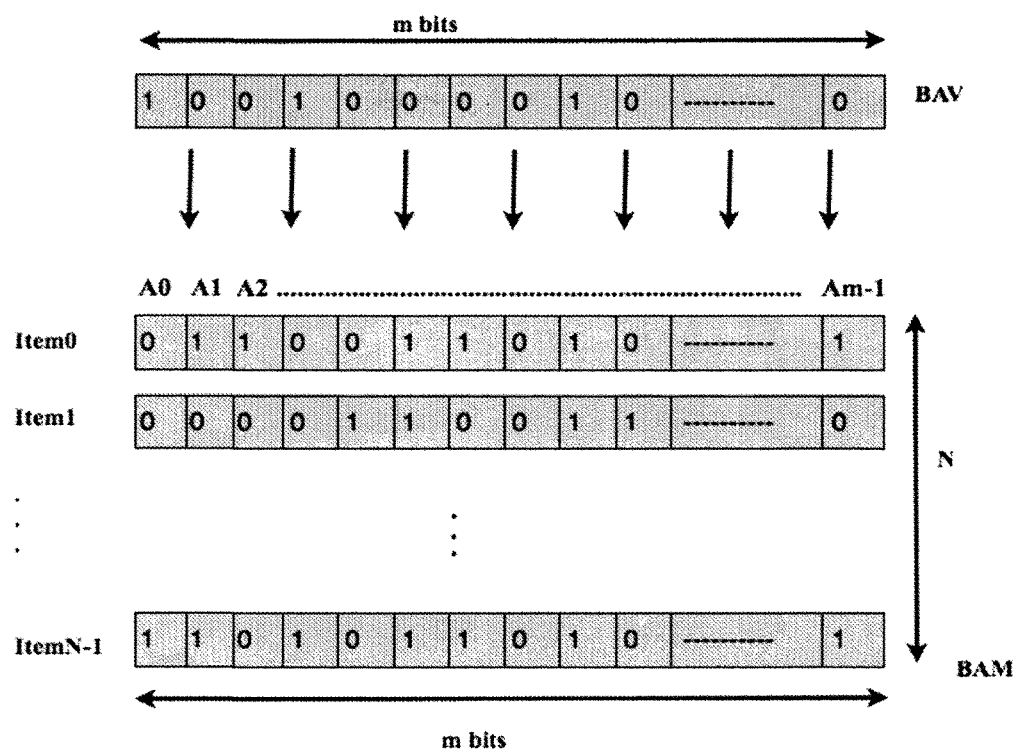
FIG. 1 is a bit attribute matrix in accordance with an embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

The following nomenclature is used herein: BAV (bit-attribute vector), BAM (bit-attribute matrix), HD (Hamming distance), k (of segments), m (length of bit-attribute vector), N (number of items in a bit-attribute matrix), $\mu$ (the least number of mismatches that a segment could have, d (Threshold (maximum number of mismatches allowed), q (number of operations to process one segment).

An overview of the invention is provided here, followed by a detailed discussion of a basic embodiment of the invention using the Pigeonhole Principle and an embodiment of the invention using the Pigeonhole Principle with FuzzyFind method[10][11]. The invention is a new efficient technique for searching very large data files, which supports Fuzzy search. Consider the following problem: a data to be searched is presented as a bit-attribute vector (see FIG. 1). The searching operation consists of finding a subset of this bit-attribute vector that is within specified Hamming distance (wherein the Hamming distance is the number of the mismatches bits). Normally, this search with approximate matching criteria requires sequential lookup (sequential search) for the whole collection of the attribute vector. Applying a sequential search substantially undermines system performance, especially for large data files, and will take a lot of time and will require more calculations. The present invention circumvents the sequential search operations and reduces the calculations tremendously.

The technique of the present invention uses a different approach based on the Pigeonhole Principle. As a result, searching proceeds much faster. This technique could be employed, in particular, for organization very large text archives. This approach can be utilized with different embodiments, but the most effective would be to use a Fuzzy Find method.

A flow chart of the operation 100 of the invention is provided in FIG. 3. As shown, the invention starts by defining d, the maximum number of mismatches that will be allowed, step 102, and dividing the BAV into k segments, step 104. Each segment is then searched, step 106, to provide a set of sorted indexes, step 108. At step 110, an exact search can be performed, steps 112, 126, or an approximate search can be performed, steps 114-122. The operation will be discussed in further detail below.

In general, the present invention works as follows. Let's assume that BAV of length n and is partitioned into segments of length 23 bit, as required by the Fuzzy Find method, steps 102, 104. Suppose we have organized directories tables, called "inverted tables" to access corresponding segments of BAV, therefore, we will locate the segments fast if they are within Hamming Distance 2 (as done in the Fuzzy Find method) from a given searching pattern. For each such match in each segment, we perform sequential lookup and compare the remaining segments within a specified Flamming distance. Thus, according to the Pigeonhole Principle, if the specified Searching Hamming Distance would equal: $d=k*(\mu+1)-1$. We will find all rows of BAM within this distance, step 116.

Consider 4 segments of length 23:

```
      2                3                3                3
|----------------|----------------|----------------|----------------|
```

If the Hamming Distance is less than this sum, i.e. 11, then we will find all rows within Hamming Distance 11 because in this case at least one segment will have at most 2 errors. So, this segment could be found with electronic speed—direct access in FuzzyFind, while other rows can be filtered out by sequential look up (a very s all part). If the Hamming distance is higher than d, then these rows still might be found with certain probability.

So instead of comparing each BAV with each row of the BAM (the search space), we segment the BAV into (k) segments, step 104, each of length m/k, where m is the length of the BAV. We have organized directories tables to access corresponding segments of BAV, step 106. Therefore, we can locate the segments fast if they are within Hamming distance (2) from the given searching pattern. For each such match in each segment, we perform sequential lookup and compare the remaining segments (candidate list) within a specified Hamming distance. Thus. according to the Pigeonhole Principle, if the specified searching Hamming distance would equal d, we will find all rows of BAM within this distance. Thus, we apply the sequential search only in very small part instead of applying it in the whole collection. Using the first illustrated embodiment below (FIGS. 1-7B) is thousands of times faster than sequential search. Using the FuzzyFind Dictionary method in the second illustrated embodiment below (FIGS. 8-12) is hundreds of times faster than the sequential search. It also, allows more mismatch tolerance and higher accuracy.

* * *

First Illustrated Embodiment—Basic Pigeonhole Search Scheme (FIGS. 1-7B)

The new search algorithm in accordance with this invention is called a "Pigeonhole search." The Pigeonhole search introduces a new data structure and therefore, we have a direct access to dictionary of fixed size words without any mismatches (exact match). This section we are representing a preliminary step to our idea of approximate search using the Pigeonhole Principle with inverted tables.

Let's illustrate the problem as the following; considering a set of information items that are characterized by binary vectors with bit position values featuring the presence or absence of corresponding attributes [20]. Such collection of items is called "bit-attribute matrix." It is a data structure for Boolean vector space [21]. It has N items vertically stored on it; each item horizontally has m bits, which is the characterizing attributes. FIG. 2A represents the basic definition of the problem, where we are looking for a bit-attribute vector (BAV) of length m=64 bits, into a bit-attribute matrix (BAM) that are within particular Hamming distance. The bit-attribute matrix contains N items form Item [0] to Item [N–1], and each item is characterized with 64 attributes from A0 to A63, as shown in FIG. 1, though the invention can be utilized for large data where N>1,000,000 and A>100.

Although conceptually all attributes are right next to the adjacent attributes physically, everything is stored by the machine words in the memory. For example, in a 64-bit system, a group of 64 attributes are stored in a 64-bit machine word [22]. Therefore, the Pigeonhole search of the present invention, partitions the bit-attribute vector into k segments of length (m/k), step 104 (FIG. 3), where we assume that each segment is a machine word.

The Pigeonhole search algorithm is based on the Pigeonhole Principle, which states that if we have (n+1) or more pigeons and n holes, then at least two pigeons must be in the same hole [23]. Accordingly, if we have k segments and (k–1) mismatches; then there must be at least one segment with no mismatches (exact match) or less number of mismatches than the other segments (i.e., 2 mismatches, in the case of FuzzyFind method). Therefore, we will locate the segments fast if they are within Hamming distance (0) from a given searching pattern. For each such match in each segment, we perform sequential lookup and compare the remaining segments within a specified Hamming distance. Thus, according to the Pigeonhole Principle, if (μ) is the least number of mismatches that a segment can have, and then the specified searching Hamming distance (Threshold) would equal to Equation (1) below, step 102 (FIG. 3). Therefore, we find all rows of the bit-attribute matrix within this distance.

$$\text{Threshold}(d)=[k\times(\mu+1)]-1 \qquad (1)$$

Accordingly, we index the search space by first, partitioning the bit-attribute matrix, vertically, into k parts, step 104 (FIG. 3). Next, we have organized directory's tables to access corresponding segments of the bit-attribute vector in the bit-attribute matrix. Therefore, we will have k tables, each of length ($2^{m/k}$) vertically. We organize each table by exchanging the index of the item with the content of the segment. Therefore, the content of the segment will be an index, for all locations of that segment in the original bit-attribute matrix. Thus, we will locate the segment much faster, step 106 (FIG. 3). Accordingly, the length of each row in each table will vary, horizontally, depend on how many locations that the segment was found in the bit-attribute matrix.

This algorithm works with different sizes of bit-attribute matrix and different length of bit-attribute vector. Accordingly, a first step 102 (FIG. 3) is to determine d based on the size m-bit of the BAV. In one embodiment. assume that m=64 bits, and there are k=4 partitions in the vector and the matrix. Therefore, the Threshold is (d=3). Each segment is 16 bits length (m/k). Eventually, we will have four tables, each of length $2^{16}$ vertically, and vary horizontally, depending on the number of locations that the segment was found on. FIG. 2A shows a 16-bit indexing.

Modes of Search, Step 110 (FIG. 3)

We would like to classify the general searching mode in two different modes. First, the exact search mode, steps 112, 126, in which we are looking for an exact match of the bit-attribute vector in the bit-attribute matrix. The second mode will be the approximate search mode, steps 114-126, where we are looking for an approximate match of the bit-attribute vector into the bit-attribute matrix, within a particular threshold (d). Furthermore, we illustrate these modes by searching either the whole search space "whole search" or partially until finding first target "partial search". In the example we use "whole search" as the default setting in order to find all possible targets. We illustrate both modes using the sequential search versus the "Pigeonhole search".

Exact Search Mode—Exact Sequential

Also known as "linear search", is a method for finding a particular value in a list; by comparing that value to every element in the list, one at a time and in sequence, until the desired value is found [14]. Consequently, in the exact sequential search, we search through the bit-attribute matrix, row by row in order to find an exact match to the bit-attribute vector. For the 'whole search', it will go through the whole bit-attribute matrix. The time complexity is O (N). For the "partial search" which will search until the first matching bit vector is found, the time complexity is O (Expectation of N). In the best case, will be O (1); and the worst case will be O (N). To Sum up, the time complexity for exact sequential search is O (N).

Exact Search Mode—Exact Pigeonhole

In Pigeonhole Search. we first index the bit-attribute matrix, as explained earlier, to get k tables for locating the bit-attribute vector's segments, step 102 (FIG. 3). The indexing step can be done in advance, and therefore, its time will not be calculated with the algorithm's running time. Then, the bit-attribute vector is partitioned into k segments and each segment will be searched through its corresponding table, step 104 (FIG. 3). Therefore, we get a set of sorted indexes for each table, step 108 (FIG. 3).

In the example of FIG. 2B. the exact Pigeonhole method is shown using an intersection. The Query is shown at the top above the BAM. For query Set 1, the bits for "0F0F" are to be queried. As shown, a match is found at line 321 of the BAM, and the set intersection is shown in the first table. For the second 16-bit query "0C56", matches are found at lines 321 and 1201. Let's assume we get the following set results:

Set1={28, 99, 321, 1033}
Set2={321, 1021}
Set3={321}
Set4={11, 144, 321}

Thus we have the general platform of Pigeonhole search. Then, in the exact Pigeonhole search, we find the intersection of all sets 1-4 (i.e., the row that is found in each of the Tables 1-4) we got from all tables, step 112 (FIG. 3). The algorithm to get the intersection of several sorted sets can have the theoretical minimum time expectation for amortized input because it uses the existing values dynamically in maximum extent. It finds all intersections, and it finishes when any set is searched out, regardless of whether other sets finished or not. For example, if third set has the less number of elements, and all elements are explored then the algorithm stops. The algorithm 1 is explained below. As a result, we will get the indexes of the locations of the bit-attribute vector in the bit-attribute matrix, as shown in FIG. 2B, step 126. Therefore, the FinalSet={321}, because each of the Sets 1-4 have a match for their respective queries at line 321.

The time complexity of exact Pigeonhole search is mainly due to the algorithm to get the intersection of k sets. Thus, it depends on the total number of items in all sets. If we assumed that all sets have fixed number of items, then, averagely, the total number of items in all sets would be $(N \times k \times 2^{-m/k})$. However, in reality, and as we mentioned previously, the number of items in each set varies depend on how many locations (indexes) that a segment were found. Therefore, we define each set as a function $F_i(x)$, where i is the index of a set, and $0 \le i \le k-1$. $F_i(x)$ is defined in equations (2) and (3). The cardinality of any set, $|F_i(x)|$, measures the number of elements (indexes) on that set, where $0 \le |F_i(x)| \le N$. Therefore, the total number of elements in all k sets is: $\Sigma_{i=0}^{k-1} |F_i(x)|$.

$$F_i(x) = \{x_1, x_2, \ldots\} \quad (2)$$

$$F_i(x) = \{x | x \in N, 0 \le x \le N\} \quad (3)$$

Since 'whole search' and 'partial search' has the same time complexity for amortized input, then the running time of exact Pigeonhole search is, at worst case, the total number of elements, which is $\Sigma_{i=0}^{k-1} |F_i(x)|$.

---

Algorithm 1 get Intersection of k sets

```
int pi = 0 where 1 ≤ i ≤ k;
int max = set₁[0]
for i = 0 downto k - 1 do
    while setᵢ[pi] ≤ max and setᵢ[pi] ≠ empty
    do
        pi + +;
        max = setᵢ[pi]
        if pi == setᵢ.end then
            exit;
        else
            if max == set₁[p1] then
                for intj = 0 downto k - 1 do
                    pj + +;
                end for
                Add item into intersection, max
            end if
        end if
    end while
end for
```

---

Approximate Search

Approximate search, also referred to as "fuzzy search", is the technique of finding all occurrences of a given searching pattern in a data file with at most k mismatches (i.e., substitutions) allowed [15], steps 114-124. We are mainly interested in the problem of approximate search with a particular number of mismatches using Hamming distance. Therefore, a bitwise XOR operation is applied to find the Hamming distance between the bit-attribute vector and the any corresponding row in the bit-attribute matrix. Then we calculate the number of ones, which is the number of the mismatches in the resulted value, using Algorithm 2. This algorithm iterate AND operation of the current result with the previous result, until the bits in the result all become zeros. Therefore, the number of ones will be the number of the iteration times.

Approximate Sequential

In the approximate sequential search, we compare each item in the bit-attribute matrix with the bit-attribute vector, sequentially, to find all items that approximately match the bit-attribute vector within threshold d. To process one bit-attribute vector, it is necessary to process k words (segments) by m bits. Suppose that we need (q) number of operations to process one word (segment) in order to verify the Hamming distance. Therefore, the total number of operations to process one bit-attribute vector is (k×q) operations. The time complexity of approximate sequential search is O(N)×k×q.

| Algorithm 2 Calculating the number of mismatches |
| --- |
| int count = 0<br>for i = 0 downto N do<br>   result = BAV ⊕ BAM [i]<br>end for<br>while result ≠ 0 do<br>   result = result & (result − 1)<br>   count + +;<br>end while<br>return count |

Approximate Pigeonhole

In approximate Pigeonhole search, we will follow the general platform of the method mentioned earlier in the section of exact Pigeonhole search and shown in the operation of FIG. 3. Accordingly, each segment of the bit-attribute vector is searched through its corresponding table. Since it is approximate search, then the desired "candidate" items have different bits from the bit-attribute vector. Therefore, if k=[d+1] (since μ=0), then any item in bit-attribute matrix with one segment exact to the corresponding segment of the bit-attribute vector will be included in the resulted candidate set. Thus we will have a set of candidate's items from each table that have at least one exact match segment with the bit-attribute vector, i.e., a union of all the Tables 1-4.

For example, applying that to FIG. 2C, set 1 is formed by a query of 0F0F, and a match is found at line 22109. Likewise, set 1 for 0C56 has matches at rows/lines 321 and 1201. Let's then assume that we get the following candidate sets:

Set1={22109}
Set2={321, 1021}
Set3 ={}
Set4={11, 144}

Then we get the union of these sets of indexes into one final set and apply an algorithm like a merge sort algorithm, in order to merge the indexes and remove the duplicates, step 114 (FIG. 3). A merge sort or, also called "collation sort" is the combination of two or more ordered lists into a single ordered list. It is comparison-based algorithm and requires O (n log n) time [24]. As a result, the FinalSet={11, 144, 321, 1201, 22109} since each of those rows have at least one match.

Now we apply an approximate sequential search to the Final set and compare each item in the set to the bit-attribute vector, step 116. Therefore, an item that has (d) mismatches or less from the bit-attribute vector, steps 118, 120, will be returned at step 122. Thus according to the example of FIG. 2C, the resulted value will be {321}, which is the location of the item in the bit-attribute matrix that matches the bit-attribute vector with 3 mismatches between them. The comparison is made of the bits that represent or correspond to the values shown in FIG. 2C. Thus for instance, when comparing 0F0F of the BAV with 0F0E in line 321 of the BAM, we compare 0F0F=(0000 1111 0000 1111) with 0F0E=(0000 1111 0000 1110). Here the difference is one bit. Then making the comparison with all the other three segments of the BAV with the segments in row 321, we will find that the difference is equal to the threshold, which is in this case (d=3).

When making this comparison then, row 1201 was eliminated since there are more than 3 mismatches in first segment alone: 0F0F (0000 1111 0000 1111) has 7 mismatches with 281A (0010 1000 0001 1010) since "0" (i.e., the bits that represent or correspond to the number "0") does not match "2" (i.e., the bits that represent the number "2"), the bits that represent the letter "F" do not match the bits that represent the number "8", the bits that represent "0" do not match the bits that represent the number "1" and the bits that represent the letter "F" do not match the bits that represent the letter "A". Row 22109 was eliminated since it has mismatches more than 3. Therefore, the only row with mismatches less than the threshold is 321.

As we can see, that approximate Pigeonhole search circumvents a lot of the required calculations and speed up the search, since we apply the approximate sequential search only in a small portion of the bit-attribute matrix.

Time complexity of the approximate Pigeonhole search is mainly due to the algorithm to get the union of k sets. The data extracted from the tables are sets of indexes in the bit-attribute matrix. As mentioned previously, the number of candidate items in all sets is $\Sigma_{i=0}^{k-1}|F_i(x)|$. Since the each set is already returning sorted indexes (elements), then the merge sort will take O (n log k). Therefore, we will need time complexity for merging and eliminating the duplicates of:

$$O((\Sigma_{i=0}^{k-1}|F_i(x)|)\log_2 k) \quad (4)$$

Then we will need (k×q) operations to process one bit-attribute vector (for Hamming distance verification), Therefore, the time needed to verify all items in all sets, is $\Sigma_{i=0}^{k-1}|F_i(x)|\times k\times q$. The overall time required for approximate Pigeonhole search is at most:

$$\Sigma_{i=0}^{k-1}|F_i(x)|\times[(\log_2 k)+(k\times q)] \quad (5)$$

Performance Evaluation—Time Analysis

For exact search, the rate that Pigeonhole search is faster than sequential search, is $N/\Sigma_{i=0}^{k-1}|F_i(x)|$. Since (m) is usually determined by the machine, (k) is variable, we can get that the less k is, the faster the Pigeonhole search will be. For k=1, it is the extreme case that the converting operation is done on the whole search space directly, not after splitting the search space. For that case, the time complexity of Pigeonhole search is O (1). But the extreme case consumes much extra space as the tradeoff.

For approximate search, considering a typical CPU speed between 1 GHz to 2 GHz or sometimes 3 GHz, then the approximate average time needed to process one operation is $10^{-9}=1$ ns, (Nanosecond). Thus, the approximate sequential lookup ($T_s$) will take:

$$T_s = N\times k\times q\times 10^{-9} \quad (6)$$

Now, we will evaluate how long this takes for Pigeonhole approximate search for the same system. As a result, the running time of approximate Pigeonhole search ($T_{ph}$), will take:

$$T_{ph}=\Sigma_{i=0}^{k-1}|F_i(x)|[(\log_2 k)+(k\times q)]\times 10^{-9} \quad (7)$$

The rate that Pigeonhole search faster than sequential search, the speedup rate, is:

$$(N\times k\times q)/(\Sigma_{i=0}^{k-1}|F_i(x)|[(\log_2 k)+(k\times q)]) \quad (8)$$

Since (m) is usually determined by the machine, (k) is determined by the threshold. This rate is usually constant for some m and threshold (d). For example, in the machine of 64 bits and the threshold for approximate search is 3, this rate could be $2^{14}$, which is 16384 times faster Pigeonhole search over sequential search.

Performance Evaluation—Space Analysis

Sequential search is static, which means it operates on its own and do not need extra space. Pigeonhole search creates extra tables which means consumes more space. In Pigeonhole search, after the indexing of the bit-attribute matrix, we get (k) tables. The vertical length of each table is $2^{m/k}$, but the horizontal length is variable. If we simply use two dimensional array without trimming to store the each table, where trimming here means we delete all the elements we do not use, total extra space is $(2^{m/k} \times k \times N)$ units, where unit here means a type which could cover the largest index in the bit-attribute matrix. For example, if the largest index in the bit-attribute matrix has x bits, a unit should a unit should be big enough to store x bits. If we do trimming on the two dimensional array for each of the tables, we may destroy the array structure and to save space we could use array with linked list. For this case, the total extra space is $k \times (N+2^{m/k})$, which is much less than the case of without trimming and it is the theoretical minimum value. But this introduces a tradeoff between how easy to implement at hardware level and how much space you want to save. If we do not trim the two-dimensional array, the algorithm design and implementation at the hardware level is simple, but with more space to use.

In addition, we could combine the advantages of both conditions above with just a little more calculation as one solution. We do trimming to save space and we keep the two- dimensional array structure to make algorithm design and implementation easy. In the new way, we should first get the biggest horizontal length for a table, and then trim the table into that length horizontally. The extra space to use depends heavily with the distribution and it will be meaningless if you do amortizing analysis or discuss it in average case. But, it does save space and keep simple structure by computing out the biggest length.

Results

In this section, we display the result of the illustrated embodiment with some analysis and graphs of FIGS. 4-5. We build the environment using C programming language, with Xcode builder tool and a Mac operating system of a memory size of 8 GB. In our example, we implement a 16-bit scheme for 64 bits of bit-attribute vector. First, we generate a 64-bit random number as a bit-attribute vector (or it could be a non random number) and we look for it through N random numbers (items) in the bit-attribute matrix, using sequential search and pigeonhole search. Generating a random number of 64 bits cannot be done with the normal random (rand ( )) function in C. This function can produce up to 32767 ($2^{15}-1$). Therefore, we used linear congruential generator, to generate 32 bits and concatenating two 32-bits random numbers to get 64-bits random number. Linear congruential generator is an algorithm that yields a sequence of randomized number calculated with a linear equation [25]. Since the bit-attribute matrix generated randomly, then the search result's execution time will differ each run trial. Therefore, in the result shown, we have an average of five runs on each different size of the bit-attribute matrix (N).

TABLE 1

EXACT MODEL RESULT

| N | Sequential search | Pigeonhole search | Speedup |
|---|---|---|---|
| $10^3$ | 8 ns | 3 ns | 3 |
| $10^4$ | 30 ns | 3 ns | 10 |
| $10^5$ | 230 ns | 4 ns | 58 |
| $10^6$ | 2270 ns | 4 ns | 570 |
| $10^7$ | 21490 ns | 8 ns | 2,690 |

We applied different sizes of the bit-attribute matrix (N), for both search modes, however, the largest size of N we could run in our machine was ($10^7$). Therefore. we need bigger memory's size to run the Pigeonhole algorithm. The results of applying the exact search mode using Pigeonhole search and sequential search is shown in Table 1, and the approximate mode of both algorithms is shown in Table 2. Both tables show the run execution) time in Nanoseconds for both algorithms (sequential search and Pigeonhole search). The Tables also shows the speedup rate. which is the ratio the Pigeonhole search to the Sequential search.

According to the results, the Pigeonhole search always performs better and take much less time than sequential search, regardless the mode of search (see FIGS. 4B, 5A). Moreover, the larger the N is, the higher the speedup rate (see FIGS. 4A, 5B), and this makes pigeonhole search more suitable and efficient for large data files. Also, it is shown in FIG. 6 that the speedup rate increases by more than the twice on each increase of the bit-attribute matrix size N. For example, the speedup rate in approximate Pigeonhole (see FIG. 5B and Table 2), goes from 3,700 when N=$10^6$ to 6,370 when N=$10^7$. Thus, it increases by more than twice; therefore, the speedup rate is approximately linear.

TABLE 2

APPROXIMATE MODEL RESULT

| N | Sequential search | Pigeonhole search | Speedup |
|---|---|---|---|
| $10^3$ | 130 ns | 7 ns | 19 |
| $10^4$ | 970 ns | 6 ns | 160 |
| $10^5$ | 9190 ns | 6 ns | 1,530 |
| $10^6$ | 92571 ns | 25 ns | 3,700 |
| $10^7$ | 892110 ns | 140 ns | 6,370 |

Furthermore, the speedup rate in exact match is less than 3000 while in the approximate search it reaches approximately to 7,000,when the bit-attribute matrix size is 107, which indicates that Pigeonhole search is more efficient in approximate search than it is in exact search, Applying the Pigeonhole Principle in approximate Pigeonhole search to find all the items in the bit-attribute matrix that matches with at least one segment of the bit-attribute vector, bypass a lot of the required calculations. Thus, we end up with a small list of candidates' items to be searched sequentially and this is what makes the Pigeonhole algorithm faster and outperforms other algorithms in approximate searching of very large data tiles.

According to the Pigeonhole Principle, if the specified searching Hamming distance would equal to the Threshold (d), we will find all rows of the bit-attribute matrix within this distance. Otherwise, if the Hamming distance is higher, then these segments still will be found within certain probability. Considering a given bit-attribute vector of size 64-bit, in which it divided into four segments of 16 bits each, with three total mismatches, then the accuracy percentage of finding that vector in the bit-attribute matrix is 95.3%.

Ultimately, the accuracy drop down when the number of mismatches increases more than the threshold (d), which is three mismatches. However, with the Pigeonhole search, these attribute vectors still will be found within specific percentage, if the number of mismatches encroaches the threshold [k×(μ+1)−1]. Now, we would like to consider the accuracy percentage for a given bit-attribute vector of size (m) with different number of maximum mismatches (Threshold). Thus, the Percentage of Accuracy (POA) will be calculated as follow:

$$POA = \left[\frac{m-d}{m}\right] \times 100\% \qquad (9)$$

The Percentage of Accuracy differs in a given size of bit-attribute matrix depend on the threshold of the mismatches. Since the Threshold (d) depends on the number of segments (k), then the POA will also depend on (k) as well. As illustrated in FIG. 6, we can have a 64 bit attribute vector that is divided into different number of equal segments (k), where 1≤k≤m. And therefore, in each segmentation the segment size is (m/k) will differ. Therefore, the threshold of the number of mismatches allowed in each segmentation, is calculated as given in equation (1).

In this case, where (μ=0), the threshold is equivalent (k−1). There is no error when we have one segment, and therefore, the accuracy will be 100% and it is 98.4% when k=2 and threshold is one. FIG. 7A shows the accuracy result on different threshold according to different segmentation on 64-bit attribute vector. As the number of segments increases, and therefore, the threshold increase; the Percentage of Accuracy decreases. Therefore, it is better to consider less segmentation, since the tolerance of mismatches is limited in the case of having at least one exact match segment (μ=0). Furthermore, considering different bit-attribute vector sizes with a fixed number of segments (k); the accuracy increases as the vector's size increases. FIG. 7B shows the Percentage of Accuracy on different bit-attribute vector sizes with a fixed number of segment k=4.

The following documents are incorporated herein by reference, and are referenced in the text above: [1] E. Berkovich, Method of and system for searching a data dictionary with fault tolerant indexing, Jan. 23 2007, U.S. Pat. No. 7,168,025; [2] S. Y. Berkovich, E. Berkovich, B. Beroukhim, and G. M. Lapir. Organization of automatic spelling correction: Towards the design of intelligent information retrieval systems. The 21st National Conference of the ASEM, (Washington D.C., pages 525-527, 2000); [3] M. Crochemore and G. Tischler. The gapped suffix array: a new index structure for fast approximate matching. In String Processing and Information Retrieval, pages 359-364. Springer, 2010.; [4] G. Navarro. Approximate text searching. PhD thesis, PhD thesis, Dept. of Computer Science, Univ. of Chile, 1998,; [5] Z. Liu, X. Chen, J. Bornernan, and T. Jiang. A fast algorithm for approximate string matching on gene sequences. In Combinatorial Pattern Matching, pages 79-90. Springer, 2005.; [6] S. Berkovich, E. El-Qawasmch, G. Lapir, M. Mack, and C. Zincke. Organization of near matching in bit attribute matrix applied to associative access methods in information retrieval. In APPLIED INFORMATICS-PROCEEDINGS-, pages 62-64, 1998.; [7] B. Chazelle. Discrepancy theory and computational geometry. In Algorithms and Data Structures, pages 1-2. Springer, 1997.; [8] R. Baeza-Yates and G. H. Gonnet. "A new approach to text searching". Communications of the ACM, 35(10):74-82, 1992.; [9] P. Clifford and R. Clifford. Simple deterministic wildcard matching. Information Processing Letters, 101(2):53-54,2007.; [10] R. Cole and R. Hariharan. Tree pattern matching and subset matching in randomized o (nlog 3 m) time. In Proceedings of the twenty-ninth annual ACM symposium on Theory of computing, pages 66-75. ACM, 1997.; [11] M. Hadjieleftheriou and C. Li. Efficient approximate search on string collections. Proceedings of the VLDB Endowment, 2(2): 1660-1661,2009.; [12] S. Anuradha, G. Raghu Ram. Evolution Of New Searching Technique In Unicast Routing Algorithm Of Data Networks, International Review on Computers and Software, vol. 4, 2009.; [13] A. Linari. Models and techniques for approximate similarity search in large databases. 2007.; [14] S. Brin. Near neighbor search in large metric spaces. 1995.; [15] T. Havens, J. Bezdek, C. Leckie, L. Hall, and M. Palaniswami. Fuzzy c-means algorithms for very large data. Fuzzy Systems, IEEE Transactions on, 20(6): 1130-1146, 2012.; [16] Z. Liu, X. Chen, J. Borneman, and T. Jiang. A fast algorithm for approximate string matching on gene sequences. In Combinatorial Pattern Matching, pages 79-90. Springer, 2005.; [17] S. Y. Berkovich and A. Hegazy. Matching string patterns in large textual files. In IEEE International Symposium on New Directions in Computing, pages 122-127, 1985.; [18] S. Wu and U. Manber. Agrep—a fast approximate pattern matching tool.; [19] R. Farivar, S. Venkataraman, Y. Li, E. Chan. A. Verma, and R. H. Campbell. Accurate sequence alignment using distributed filtering on gpu clusters.; [20] S. Y. Berkovich and E. El-Qawasnneh. Reversing the error correction scheme for a fault-tolerant indexing. The Computer Journal. 43(1): 54-64, 2000.; [21] M. W. Berry. Survey of Text Mining I: Clustering, Classification, and Retrieval, volume 1. (Springer, 2004).; [22]. J. Byun. Organization of information retrieval procedures for approximate attribute matching. PhD thesis, Dept. of Computer Science, George Washington University. 2010.; [23] S. B. Maurer and A. Ralston. Discrete algorithmic mathematics. (Addison-Wesley Reading Mass., 1991).; [24] E. K. Donald. The art of computer programming. Sorting and searching, 3:426-458, 1999.; [25] S. K. Park and K. W. Miller. Random number generators: good ones are hard to find. Communications of the ACM, 31(10): 1192-1201, 1988.; [26] P. Kvasnica, I. Kvasnica. Parallel Modelling of Fault-Tolerant Software Systems, International Review on Computers and Software, vol. 7, 2012.

Second Illustrated Embodiment—The Pigeonhole Search with FuzzyFind Technique (FIGS. 8-12)

Organization of the retrieval of information items according to a fuzzy criterion essentially depends on the representation of information items and the method of their comparison [8]. The technique of the present embodiments presents efficient searching with fuzzy criteria in very large information systems. It is specifically aimed at selecting Binary Feature Vectors from the rows of Bit-Attribute Matrices that are within a specified Hamming distance. The technique, as we called it "Pigeonhole search" in the first embodiment above, uses a different approach based on the Pigeonhole Principle. The most effective realization of this technique is to use FuzzyFind Dictionaries (FFD)[1][2], as provided in the present embodiment.

Figure 10:
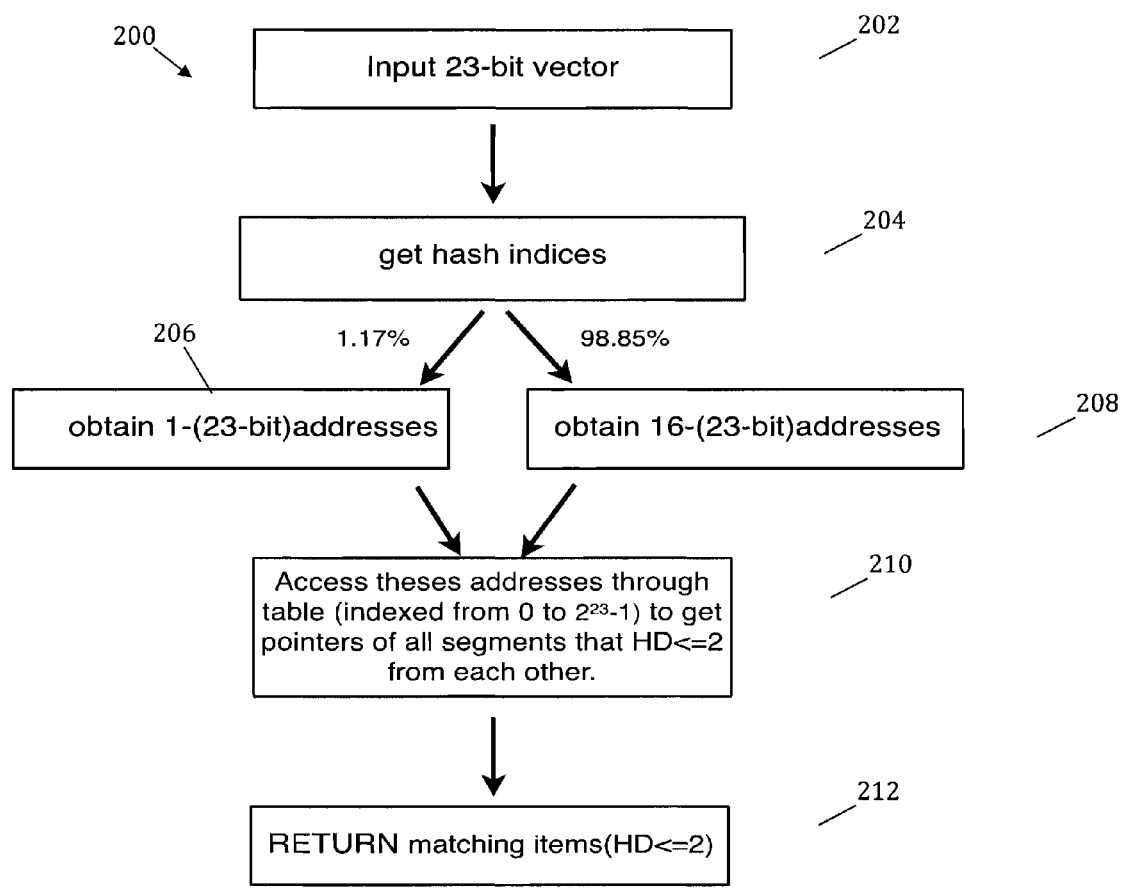
FIG. 10 is a flow diagram for the FFD.

The FuzzyFind Dictionary (FFD) is best illustrated in FIG. 8, and its operation is shown in FIG. 200. The FFD is a unique data structure that provides direct access to approximately matching information items, which are close in terms of Hamming's metric in binary attribute space [2]. This is based on a technique of fault tolerant indexing using error-correcting codes. The technique of fault-tolerant indexing is based on reversing the error correction scheme for Golay code for 23-bit binary vectors [20], step 202. The decoding procedure being applied to a sphere of these binary vectors of Hamming's radius 1 mostly generates six indices in such a way that two binary vectors at distance 2 have two indices in common [2], step 204 (FIG. 10).

For example, suppose we have two 23-bit vectors represented by two integers: 1036 ($2^{10}+2+2^2$) and 1039 ($2^{10}+2^3+2^2+2^1+2^0$). These numbers differ in only the two last bit positions. Their six hash indices turn out to be: 1036 ->(0, 1054, 1164, 1293, 1644, 3084); 1039 ->(527, 1054. 1063, 1099, 1293, 3215). We store the input vectors (1036 and 1039) at the hash table locations specified by these 12-bit keys. Therefore, in searching for the 23-bit vector 1036, we access the hash location 1054 and also find the vector 1039. Thus, by using a few direct accesses, each "fuzzy" search returns a neighborhood around the desired item [2].

Accordingly, there are three basic provisions in realization of fuzzy retrieval with the FuzzyFind Dictionary data structure. (1) Attributes of information items have to be mapped to a binary vector in such a way that closeness in attribute discrepancies is translated into closeness of binary vectors in Hamming's metric, (2) the format of the fault-tolerant indexing based on this scheme imposes limitations on the length of the binary vector, in the case of Golay code the length is 23, and (3) the retrieved binary vectors cannot deviate from the search vector more than a relatively small value (i.e. 2) of the Hamming distance [2].

Therefore. as shown in FIG. 8, the FuzzyFind Dictionary would be considered as a table with an input of 23-bit key and outputs of all the keys within a Hamming distance of 2 from the input key. The developed FuzzyFind dictionary of about 100,000 words exhibits much better characteristics in comparison to implementation of this dictionary using other known methods. Typically, an average retrieval time per word is about 0.5 msec. Therefore, enhancing FuzzyFind method with the method of this invention makes it run thousands of times faster, if it were performed on the same collection of data by a sequential lookup.

In the suggested invention of Pigeonhole search using FuzzyFind Dictionary, we have a direct access to a dictionary of 23-bit words tolerating 2 mismatches.

Fault Tolerant Indexing with Hash Transformation of Golay Code

In accordance with the present embodiment of the invention, fuzzy search processes can take advantage of hashing techniques in order to have fast access. It would be even better to have a hash function that is not sensitive to certain deviations from a standard representation of information items. In hashing, the place where the aimed information items are stored is accessed directly, then the choice of a suitable item requires traversing a relatively small amount of additional data [8]. For example, using SOUNDEX encoding [13], as a preliminary step to hashing it is possible to get an index that can tolerate some spelling variations for similarly sounding names. A more general approach to fuzzy searching would require a hash transformation that can tolerate mismatches of bit attribute strings. This would allow a certain neighborhood of a given vector to be referred to the same hash table location. A possible approach has been described in [2]. It is based on reversing the regular error correction scheme for a perfect code, such as the Golay code (23, 12, 7). With this code, the whole set of 23-bit vectors—the vertices of a 23 dimensional binary cube—is partitioned into $2^{12}$ spheres of radius 3. So a transformation that maps 23-bit strings to 12-bit centers of these spheres is able to tolerate certain dissimilarities in bit positions of the 23-bit strings. Presenting the attributes by means of a 23-bit template yields an assortment of 12-bit indices, which provides fault-tolerance facilities for fuzzy matching and retrieval.

A hash transformation using the Golay code decoding procedure is applied to neighborhood spheres of radius 1 surrounding 23-bit binary vectors. This transformation yields 6 hash indices in 86.5% cases and one hash index in 13.5% of the cases (see FIG. 9). So, on average the redundancy in indexing an information item introduced by this technique is about 6·0.865+1·0.135=5.3. To directly find binary strings deviating from a given key within the Hamming distance 2 it would be necessary just to replicate the contents of the dictionary by a factor of 5.3 with a corresponding increase in the number of accesses.

FuzzyFind Dictionary Organization

Applying Golay code hash transformation as mentioned in the previous section will generate six hashes in about 86.5% of the cases (let's call them Case A), and one hash in approximately 13.5% of the cases (let's call them Case B), as shown in FIG. 9. Also, we will replicate the contents of the dictionary by a factor of 5.3, as mentioned previously, in order to search for binary strings deviating from a given key within Hamming distance 2. In the first case (Case A), we will use pairwise concatenations of the indices, in order to get 15 addresses, (which is pair combinations of the six indices; C (6, 2)), each address is of size 23 bits. One more address will be extracted from the pairwise concatenation of the "zero-index" with itself. This index is the first hash value of Golay code transformation. Thus, we will generate 16 addresses for Case A.

The basic scheme for fault-tolerant hashing with Golay code transformation and FuzzyFind transformation is shown in FIG. 9. Generally, a tolerance to 1-bit mismatch can be implemented by probing each hash index corresponding to all 1-bit modifications of a given word [2]. Thus, in Case B, we have only one 12-bit index, and this retrieval would require probing the hash values for the key modifications of the given key. These 1-bit modifications values are the numbers (1, 2 and 4), and this is shown in the FIG. 9, where we use bitwise XOR to create a new vectors (V1, V2, V4). Then applying Golay code hash transformation on these vectors, will yield to two situations in Case B. In the first, we will got 6 indices and from those we will obtain 16 addresses (as in Case A), and this will occur in 12.35% as shown in FIG. 9. The second situation of Case B, is where we would have only one index, (just 1.17%), and from this we will obtain only one 23-bit address. Thus, we will have about 98.82% of the 23-bit vectors that have 16 addresses, which is step 208 of FIG. 10, and only 1.17% vectors with one address which is step 206 in FIG. 10.

In certain circumstances, the 12-bit indices issued by two 23-bit vectors at Hamming distance 2 have two common values (as the example of (1036 and 1039)). Therefore, using pairwise concatenations of the indices it is possible to place information items with binary vectors at Hamming distance 2 in the same buckets. Thus 1036 and 1039 will have one common 23-bit address (as shown below in the next paragraph), which is the result of the concatenation of the two common 12-bit indices. This would be implied to all vectors that have two distortions or less from each other.

| 1036 → | 1039→ |
|---|---|
| 192 | 164320 |
| 480 | 164620 |
| — | — |
| 1969158 | 1969158 |
| — | — |
| 6540294 | 6306822 |

Implementation of the Developed Pigeonhole Search.

Now we are going to Supplement FuzzyFind Dictionary into the method of the present invention (Pigeonhole search). Thus in this search, we will have a direct access to a dictionary of 23-bit words tolerating 2 mismatches. Suppose we have the same basic problem as in FIG. 1. Applying the Pigeonhole search, we partition the Bit-Attribute Vector into segments of length 23 bits, as required by the FuzzyFind method, steps 102, 104 (FIG. 3). Then we access each segment through its corresponding FuzzyFind Dictionary table, step 106. We can locate the segments fast if they are within a Hamming Distance of 2 from given searching pattern, steps 116-122. For each such match in each segment, we perform sequential lookup and compare the remaining segments within a specified threshold.

Figure 11:
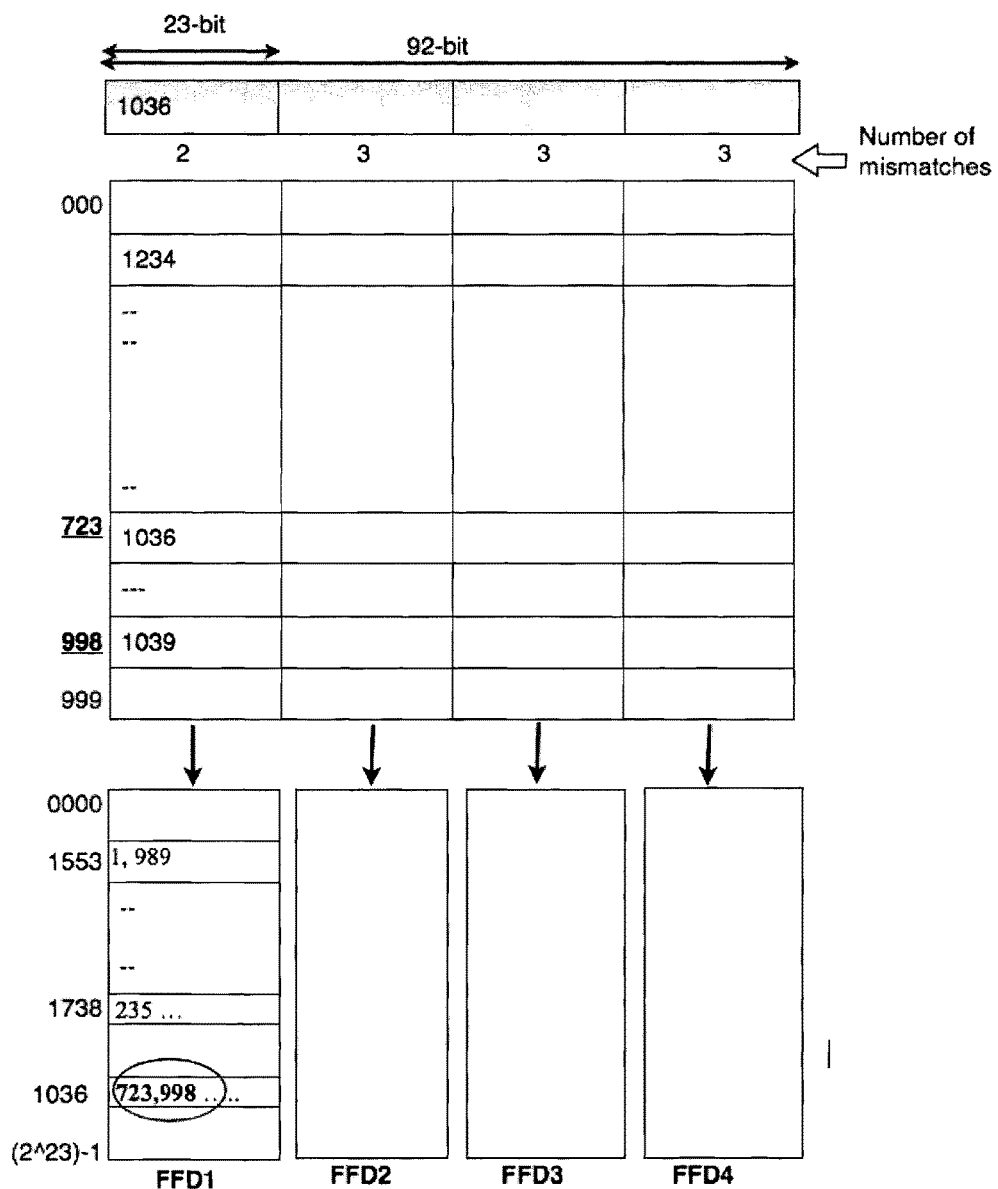
FIG. 11 is a developed scheme for the Pigeonhole search with FFD.

FIG. 11 shows a 92-bit attribute vector that is partitioned into four segments, each of size 23 bits. Each segment is accessed through its corresponding FuzzyFind Dictionary table (in this case we have four FFD, namely FFD1-FFD4). Each FFD table is indexed from 0 to $2^{23}-1$. Therefore, accessing a segment like 1036, as shown in FIG. 11, through its corresponding FFD, we will obtain all its 16 addresses (step 208) and then accessing these addresses, we will get pointers to all segments that are within a Hamming distance of 2 or less from the given segment, which is in this case 1036 (step 210). Therefore, in FIG. 11, index 1036 in the FFD1 shows the pointers to the location of the segments 1036 and 1039, which are within Hamming distance 2 from each other (step 212).

Thus, all the matching locations of the suggested items will be gathered in a candidate list. This list is then searched sequentially and each item is compared with the original 92-bit vector. Thus we only retrieve the items that are within the specified threshold from the given vector. In the 92-bit vector example, the threshold equals eleven (11) mismatches.

This indicates that using FuzzyFind Dictionary (FFD) can have bigger tolerance of mismatches than the case of having at least one segment with exact match as in the 64-bit example (11 mismatches Vs. 3 mismatches). For instance, in the first embodiment above, there were only 3 mismatches in 4 segments, 3 of them each have one mismatch and one segment without any mismatches. However, in the present embodiment using FFD, there can be 4 segments, and 3 of them each have 3 mismatches and the last one can have 2 mismatches, for a total of 11 mismatches. Another advantage is that the use of FuzzyFind Dictionary can have bigger size of segment and therefore, bigger size of Bit-Attribute Vector (92-bit Vs. 64-bit).

Typical results for a simplistic case of 64-bit words tolerating 3 bit mismatches are shown in Table 3, Table 3 shows the time taken (in nanoseconds (ns)) by the sequential search versus Pigeonhole search. It also shows how much Pigeonhole search is faster than a corresponding sequential algorithm (speedup). The results show that Pigeonhole search is faster than sequential search by more than 6,000 times, when the file size is $10^7$; and this is demonstrated in FIG. 12 as well.

TABLE 3

APPROXIMATE SEARCH RESULTS OF 64-BIT BASIC SCHEME

| N | Sequential Search | Pigeonhole search | Speedup |
|---|---|---|---|
| $10^3$ | 130 ns | 7 ns | 19 |
| $10^4$ | 970 ns | 6 ns | 160 |
| $10^5$ | 9190 ns | 6 ns | 1,530 |
| $10^6$ | 92571 ns | 25 ns | 3,700 |
| $10^7$ | 892110 ns | 140 ns | 6,370 |

If we adjust the results of the 64-bit case to suits the new case of 92-bit vector tolerating 11 mismatches; and where we have FFD applied in the Pigeonhole search, we will have the results shown in Table 4 below. In the sequential search, searching for 92-bit vector will be slower than searching for 64-bit vector by 1.5 times (92/64). While in the case of the Pigeonhole search, the developed scheme will be slower than the basic scheme by 16 times. Since in the basic scheme, accessing the table will take one unit of time. While in the developed scheme with the FFD, the accessing will take 16 units of time, in order to access all the 16 addresses.

The results in Table 4 shows that the developed scheme of Pigeonhole search with FFD is hundreds times faster than regular sequential search. In contrast to initial example of 64-bit basic scheme, it allows searching with about 12% accuracy (1192) rather than 4.5% accuracy (364).

TABLE 4

APPROXIMATE SEARCH RESULTS OF 92-BIT DEVELOPED SCHEME WITH FFD

| N | Sequential Search | Pigeonhole search | Speedup |
|---|---|---|---|
| $10^3$ | 195 ns | 112 ns | 2 |
| $10^4$ | 1,455 ns | 96 ns | 15 |
| $10^5$ | 13,785 ns | 96 ns | 144 |
| $10^6$ | 138,857 ns | 460 ns | 347 |
| $10^7$ | 1,338,165 ns | 2240 ns | 597 |

Figure 12:
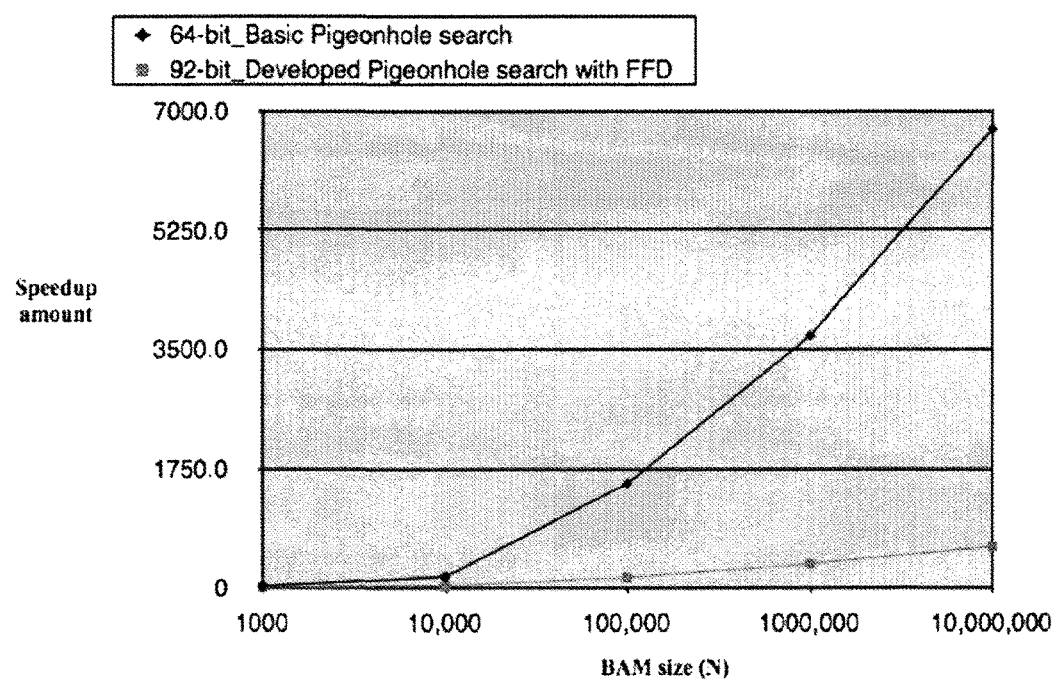
FIG. 12 is a chart showing a comparison of the Pigeonhole search speedup in both schemes.

FIG. 12 shows a comparison between the speedup for Pigeonhole search in both schemes (the basic 64-bit and the developed 92-bit scheme with FFD). Although the speedup for the new scheme is slower than the basic scheme, the new scheme is still faster than the regular sequential search by more than 500 times. It also shows more accurate results and allows more mismatches tolerance, than the basic scheme.

CONCLUSION AND APPLICATIONS

This technique of fuzzy searching is aimed at one of the most challenging problem of modern information technology—how to search efficiently within very large data files. It also outperforms other search techniques like the sequential search. It runs thousands times faster than if it were performed on the same collection of data by a sequential lookup. From the illustrated embodiments, this algorithm can successfully be applied in very large database systems that are beyond terabyte and even petabyte in size. Thereby, applying the Pigeonhole Principle in accordance with the present invention reduces the calculations and increases the performance. However, the Pigeonhole search requires added memory size to create the FFD dictionary tables.

The Pigeonhole search of the present invention is specifically aimed to deal with applications that select bit-attribute vectors from the rows of bit-attribute matrices. It also, can be employed, in particular, for organization very large text archives. Other possible applications could include: verification of biometric characteristics or other bio informatics (such as genetics or genetic coding), error correction coding and fault tolerant, Quick Response (QR) code, and efficient searching of textual arid pictorial information. Many existing applications and researches could benefit from the Pigeonhole search algorithm, such as: Fault tolerant system in [20] and [26], and associative memory application in [6].

As we mentioned earlier, this invention is the core step for using a FuzzyFind search, and can be implemented on larger bit-attribute vectors with a size up to 1024 bits. Further optimization techniques can be utilized, for instance further optimization by splitting the bit-attribute matrix and the bit-attribute vector in a better way such as a random way to split, for example splitting at m/k, 2m/k, 3m/k, . . . m, is already the best. The running time of Pigeonhole search is mainly due to operations to get intersection and union of k sets. And different splitting algorithm may create different distribution in k sets. For exact search to get the intersection and approximate search to get union, the running time of current algorithm corresponds to the total amount of elements in k sets. If we create a distribution very unevenly, we could get some faster in getting intersection and union of two sorted sets. However, the reality is when we guarantee the distribution in one table, we cannot guarantee others, because they are related tightly. As a result, even the improvement exists, the overall time complexity differs little. But the cost Koro preferred distribution could be very high in the algorithm.

This work contributes to the area of searching very large files with fuzzy criteria. Big Data systems would benefit from this technology and use it as a part of their sophisticated search operations, especially, in searching very large archives. Another interesting application where we can directly apply our technology is the QR code. A QR code is a type of two-dimensional barcode that is in the form of the matrix code [14]. Given a full bit-template we have to find among a tremendous amounts of QR codes, a given one. This can be done with the developed scheme of the technique of the present invention (Pigeonhole search), with about 13% accuracy. The other algorithms that have been used in QR code searching are not quite efficient; therefore, the technique of the present invention has an excellent contribution in such search. In general, Pigeonhole search is a practical technique that searches files beyond terabytes and still can perform much faster than traditional search algorithm like sequential search.

The following documents are incorporated herein by reference, and are referenced in the text above: [1] M. Crochemore and G. Tischler. The gapped suffix array: a new index structure for fast approximate matching. In String Processing and Information Retrieval, pages 359-364. Springer, 2010.; [2] S. Y. Berkovich and E. El-Qawasmeh. Reversing the error correction scheme for a fault-tolerant indexing. The Computer Journal, 43(1): 54-64, 2000.; [3] P. Clifford and R. Clifford. Simple deterministic wildcard matching. Information Processing Letters, 101(2):53-54, 2007.; [4] R. Cole and R. Hariharan. Tree pattern matching and subset matching in randomized o (nlog 3 m) time. In Proceedings of the twenty-ninth annual ACM symposium on Theory of computing, pages 66-75. ACM, 1997.; [5] S. Y. Berkovich and A. Hegazy. Matching string patterns in large textual files. In IEEE International Symposium on New Directions in Computing, pages 122-127, 1985; [6] M. Hadjieleftheriou and C. Li. Efficient approximate search on string collections. Proceedings of the VLDB Endowment, 2(2): 1660-1661, 2009.; [7] S. Berkovich, E. El-Qawasmeh, G. Lapir, M. Mack, and C. Zincke. Organization of near matching in bit attribute matrix applied to associative access methods in information retrieval. In APPLIED INFORMATICS-PROCEEDINGS-, pages 62-64, 1998.; [8] Berkovich, Simon, and Duoduo Liao. "On clusterization of big data streams." Proceedings of the 3rd International Conference on Computing for Geospatial Research and Applications. ACM, 2012; [9] M. Yammahi, C. Shen, S. Berkovich. Approximate Search in very large files using the Pigeonhole Principle, International Review on Computers and Software (IRECOS), Vol. 8, No. 12.; [10] M. Yammahi, K. Kowsari, Chen. Shen and Simon Berkovich, "An efficient technique for searching very large files with fuzzy criteria using the Pigeonhole Principle", COM.Geo 2014; [10] E. Berkovich, Method of and system for searching a data dictionary with fault tolerant indexing, Jan. 23, 2007. U.S. Pat. No. 7,168, 025.; [11] S. Y. Berkovich, E. Berkovich, B. Beroukhim, and G. M. Lapir. Organization of automatic spelling correction: Towards the design of intelligent information retrieval systems. The 21st National Conference of the ASEM, (Washington D.C., pages 525-527, 2000).; [12] S. B. Maurer and A. Ralston. Discrete algorithmic mathematics. (Addison-Wesley Reading Mass., 1991).; [13] Kukich, Karen, 1992. "Techniques for Automatically Correcting Words in Text," ACM Computing Surveys, Vol. 24, No. 4, pp. 377-43; [14] Poomvichid, T., Patirupanusara, P., & Ketcham, M. (2012, August). The QR code for audio watermarking using Genetic algorithm. In Proceedings of the International Conference on Machine Learning and Computer Science (IMLCS'12) (pp. 171-174).

Figure 13:
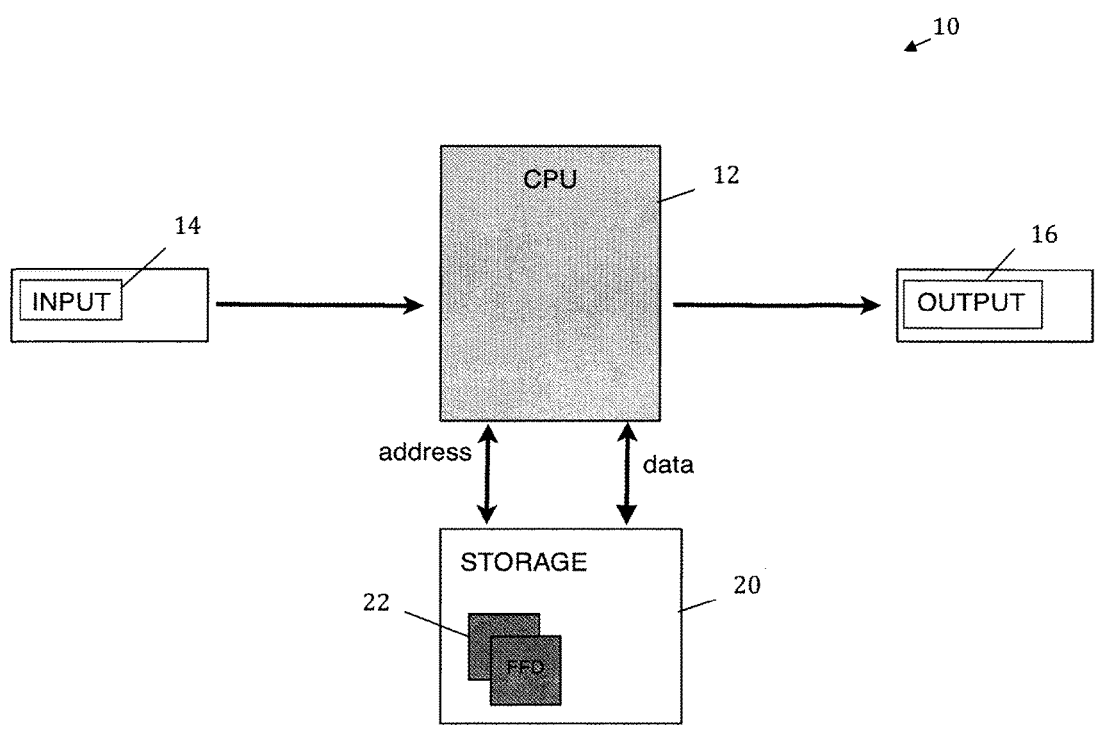
FIG. 13 is a block diagram of the system of the present invention.

Implementation (FIG. 13)

As shown in FIG. 13, the invention discussed in the embodiments above can be implemented, for instance, in a system 10 having a computer or computing device 12 with a processor, processing device or controller to perform various functions and operations in accordance with the invention. The computer can be, for instance, a personal computer (PC), server or mainframe computer. The processor may also be provided with one or more of a wide variety of components or subsystems including, for example, a co-processor, register, data processing devices and subsystems, wired or wireless communication links, input devices, monitors, memory or storage devices 20 such as a database. All or parts of the system and processes can be stored on or read from computer-readable media. The system can include computer-readable medium, such as a hard disk, having stored thereon machine executable instructions for performing the processes described. The entire operation is conducted automatically by the processor, and without any manual interaction. Accordingly, the process can occur substantially in real-time without any delays.

The invention can also be implemented by or on a non-transitory computer readable medium, such as any tangible medium that can store, encode or carry non-transitory instructions for execution by the computer and cause the computer to perform any one or more of the operations of the invention described herein, or that is capable of storing, encoding, or carrying data structures utilized by or associated with instructions.

In an embodiment of the invention, the processing device 12 creates the FFDs 22, which are then stored in a database or memory device 20 that is in communication with the processing device. The processing device 12 can store and retrieve data to/from the storage device 20. For instance, the processing device 12 can store and retrieve data such as address data to from the FFDs 22. The FFDs 22 can be preprocessed in advance of any search and stored in the storage device 20, which a different FFD 22 for each attribute vector size.

The very large data is stored on one or more processing devices operated by third parties that can be networked together, such as the Internet, and is accessed remotely by the processing device of the invention. In another embodiment, the very large data can be stored locally at the processing device 12. The processing device 12 has an input 14 to receive, for instance, the very large data to be searched and the query (such as term(s)) that are to be searched. The processing device 12 also has an output 16 that provides the results of the search that is conducted by the processing device 12. In addition, the very large data can be unstructured data that is converted to a Bit Attribute Matrix.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A system for conducting an approximate search for a search query of large amounts of data items, the system comprising:
   a processing device configured to:
      receive the search query;
      partition the search query based on a size of a data item segment;
      generate an indexed plurality of data item segments of a plurality of data items for each partition of the search query, wherein the plurality of data item segments have a length m/k of more than 23 bits, and wherein the plurality of data item segments are binary vectors and m is a length of each of the data items;
      determine a threshold maximum number of permissible mismatches;
      determine a total number of mismatches with the search query for each of the data items;
      generate a list of candidate data items including the data items with a total number of mismatches that is equal to or less than the threshold number of permissible mismatches; and
      return the list of candidate data items for display,
      wherein the threshold number is based on a number of the plurality of data item segments, and the threshold number is $[k \times (\mu+1)]-1$, where k is a number of the plurality of data item segments and $\mu$ is the least number of mismatches for one of the plurality of data item segments.

2. The system of claim 1, wherein the processing device is further configured to remove from the list candidate data items having at least one data item segment with a number of mismatches greater than the threshold number of permissible mismatches.

3. The system of claim 1, wherein the threshold number is based on a Hamming distance.

4. A system for conducting an approximate search for a search query of large amounts of data items, the system comprising:
   a processing device configured to:
      receive the search query;
      partition the search query based on a size of a data item segment;
      generate an indexed plurality of data item segments of a plurality of data items for each partition of the search query, wherein the plurality of data item segments have a length m/k of more than 23 bits, and wherein the plurality of data item segments are binary vectors;
      determine a threshold maximum number of permissible mismatches;
      determine a total number of mismatches with the search query for each of the data items;
      generate a list of candidate data items including the data items with a total number of mismatches that is equal to or less than the threshold number of permissible mismatches; and
      return the list of candidate data items for display,
      wherein the data items are each partitioned based on a Pigeonhole Principle into k segments, each of length (m/k), where m is a length of the data item, wherein the Pigeonhole Principle involves selecting data item segments within a predetermined Hamming distance.

5. The system of claim 1, wherein each of plurality of data item segments is a machine word.

6. The system of claim 1, wherein the processing device is further configured to sequentially analyze each of the data items to determine a number of mismatches.

7. The system of claim 1, wherein files of data items are unstructured and can be converted to Bit Attribute Matrix in a format of text, gene data (DNA sequence), QR code image, or other format.

8. The system of claim 1, wherein the index utilizes organized directory tables which are either inverted table or FuzzyFind Dictionaries.

9. A system for conducting an approximate search for a search query of large amounts of data items, the system comprising:
   a processing device configured to:
      receive the search query;
      partition the search query based on a size of a data item segment;
      generate an indexed plurality of data item segments of a plurality of data items for each partition of the search query, wherein the plurality of data item segments have a length m/k of more than 23 bits, and wherein the plurality of data item segments are binary vectors and m is a length of each of the data items;
      determine a threshold maximum number of permissible mismatches;
      determine a total number of mismatches with the search query for each of the data items;
      generate a list of candidate data items including the data items with a total number of mismatches that is equal to or less than the threshold number of permissible mismatches; and
      return the list of candidate data items for display,
      wherein said processing device is further configured to create k organized directory tables to access the data item segments, each data item segment having a length of $2^{m/k}$ vertically.

10. The system of claim 9, wherein the organized directory tables are inverted tables organized by exchanging an index of the data item with content of the data item segment.

11. The system of claim 10, wherein a length of each table varies horizontally depending on a number of locations that a search query segment is found.

12. The system of claim 10, wherein the processing device is further configured to search the plurality of data item segments by:
- accessing the data item segments through a corresponding table,
- sort the indexes for each table to provide k sets, and
- sequentially searching a union or an intersection for the k sets.

13. The system of claim 11, wherein at least one search query segment has zero mismatches µ.

14. The system of claim 9, wherein the directory tables are a FuzzyFind Dictionary.

15. The system of claim 14, wherein the least number of segments µ is 0 or 1 or 2.

16. The system of claim 14, wherein the searching comprises accessing each data item segment through a corresponding FuzzyFind Dictionary Table for segments within a Hamming Distance of 2 from respective search query segments.

17. The system of claim 16, wherein the processing device is further configured to obtain all corresponding 16 addresses of a data item segment within the FuzzyFind Dictionary and access the addresses to obtain pointers to locations in the data of all segments within a Hamming distance of 2 or less from the respective search query segments.

18. The system of claim 17, wherein the processing device is further configured to sequentially search each data item on the candidate list and compare each data item on the candidate list with an original vector query.

* * * * *